United States Patent
El Ghusayni et al.

(10) Patent No.: US 12,385,882 B2
(45) Date of Patent: Aug. 12, 2025

(54) NON-DESTRUCTIVE TESTING AND CLEANING APPARATUS

(71) Applicant: Arkan Al Falah company for Industry, Dammam (SA)

(72) Inventors: Roudi El Ghusayni, Dammam (SA); Wafa Al Burr, Dammam (SA); Ahmed S. Al Zahrani, Dammam (SA)

(73) Assignee: Arkan Al Falah Company for Industry (SA)

( * ) Notice: Subject to any disclaimer, the term of this patent is extended or adjusted under 35 U.S.C. 154(b) by 575 days.

(21) Appl. No.: 17/491,035

(22) Filed: Sep. 30, 2021

(65) Prior Publication Data

US 2022/0214314 A1  Jul. 7, 2022

(51) Int. Cl.
| | | |
|---|---|---|
| G01N 29/265 | (2006.01) | |
| B08B 5/04 | (2006.01) | |
| B08B 9/08 | (2006.01) | |
| G01B 17/02 | (2006.01) | |
| G01N 29/04 | (2006.01) | |
| G05D 1/00 | (2024.01) | |

(52) U.S. Cl.
CPC ............ *G01N 29/265* (2013.01); *B08B 5/04* (2013.01); *B08B 9/08* (2013.01); *G01B 17/02* (2013.01); *G01N 29/04* (2013.01); *G05D 1/0214* (2013.01); *G05D 1/0219* (2013.01); *G05D 1/0246* (2013.01); *G05D 1/0255* (2013.01); *G01N 2291/023* (2013.01); *G01N 2291/02854* (2013.01)

(58) Field of Classification Search
CPC ................. G01N 29/265; G01N 29/04; G01N 2291/023; G01N 2291/02854; G01N 2291/025; G01N 29/225; B08B 5/04; B08B 9/08; G01B 17/02; G05D 1/0214; G05D 1/0219; G05D 1/0246; G05D 1/0255; G05D 2201/0203; G05D 1/0038; G01S 7/521; G01S 15/931
See application file for complete search history.

(56) References Cited

U.S. PATENT DOCUMENTS

| | | | | |
|---|---|---|---|---|
| 8,812,154 B2 * | 8/2014 | Vian | ..................... | G07C 5/0808 700/258 |
| 9,038,557 B2 * | 5/2015 | Smith | ..................... | B62D 55/32 901/1 |

(Continued)

*Primary Examiner* — Bhavesh V Amin
(74) *Attorney, Agent, or Firm* — Timothy T. Wang; Ni, Wang & Massand, PLLC

(57) ABSTRACT

The present invention provides a non-destructive testing and cleaning apparatus. The present invention provides a remotely operated vehicle (ROV) that inspects and cleans a surface. The remotely operated vehicle (ROV) is an intelligent robotic vehicle that inspects and cleans the surface automatically. The remotely operated vehicle (ROV) includes an inspection module. The inspection module inspects the surface and allows the remotely operated vehicle (ROV) to move on a path along the surface. In addition, the remotely operated vehicle (ROV) includes a cleaning module. The cleaning module allows the remotely operated vehicle (ROV) to clean the pre-determined path along with the surface. Furthermore, the remotely operated vehicle (ROV) connected with a master control unit for providing commands to operate and control the remotely operated vehicle (ROV).

19 Claims, 32 Drawing Sheets

(56) References Cited

U.S. PATENT DOCUMENTS

| | | | | |
|---|---|---|---|---|
| 9,753,461 B1* | 9/2017 | Johnson | | G05D 1/0011 |
| 10,232,897 B2* | 3/2019 | Hafenrichter | | B25J 15/0019 |
| 10,313,575 B1* | 6/2019 | Wingo | | B64U 10/00 |
| 10,340,983 B2* | 7/2019 | Liu | | H04B 3/36 |
| 10,475,176 B2* | 11/2019 | Nakayama | | G06T 7/001 |
| 10,703,476 B2* | 7/2020 | Allard | | B64U 80/86 |
| 10,752,381 B2* | 8/2020 | Riera | | B64D 11/0631 |
| 10,782,267 B1* | 9/2020 | Alrowaeyh | | B25J 9/162 |
| 11,543,809 B2* | 1/2023 | Kraniak | | G05B 19/41875 |
| 2007/0042803 A1* | 2/2007 | Anderson | | G05D 1/0225 |
| | | | | 455/556.1 |
| 2008/0216869 A1* | 9/2008 | Dayton | | B08B 9/051 |
| | | | | 15/93.1 |
| 2008/0262669 A1* | 10/2008 | Smid | | G05D 1/0278 |
| | | | | 701/23 |
| 2012/0215348 A1* | 8/2012 | Skrinde | | B25J 9/163 |
| | | | | 701/2 |
| 2014/0188325 A1* | 7/2014 | Johnson | | G05D 1/0227 |
| | | | | 901/1 |
| 2017/0081000 A1* | 3/2017 | Cioanta | | B08B 3/024 |
| 2017/0089502 A1* | 3/2017 | Genta | | B66F 7/065 |
| 2018/0035606 A1* | 2/2018 | Burdoucci | | A01D 34/008 |
| 2018/0036890 A1* | 2/2018 | Hollister | | H04B 10/25 |
| 2018/0079476 A1* | 3/2018 | Abdellatif | | B08B 9/023 |
| 2018/0120196 A1* | 5/2018 | Georgeson | | G01N 21/88 |
| 2018/0273173 A1* | 9/2018 | Moura | | G01N 25/72 |
| 2018/0290748 A1* | 10/2018 | Corban | | G06T 19/006 |
| 2018/0300871 A1* | 10/2018 | Wu | | G05D 1/0094 |
| 2018/0321692 A1* | 11/2018 | Castillo-Effen | | G05D 1/101 |
| 2018/0322699 A1* | 11/2018 | Gray | | G08G 5/55 |
| 2018/0329433 A1* | 11/2018 | Zhao | | G05D 1/0276 |
| 2019/0011403 A1* | 1/2019 | Amer | | G01N 17/02 |
| 2019/0055015 A1* | 2/2019 | Allard | | G05D 1/0038 |
| 2019/0235083 A1* | 8/2019 | Zhang | | G01S 7/51 |
| 2019/0248485 A1* | 8/2019 | Ulaganathan | | G05D 1/0088 |
| 2019/0266715 A1* | 8/2019 | Myers | | B64U 80/25 |
| 2019/0325668 A1* | 10/2019 | Cole | | G05D 1/0692 |
| 2020/0019167 A1* | 1/2020 | Alshamrani | | G05D 1/101 |
| 2020/0174478 A1* | 6/2020 | Abdellatif | | B62D 57/024 |
| 2020/0207488 A1* | 7/2020 | Troy | | G05D 1/0094 |
| 2020/0209891 A1* | 7/2020 | Gusikhin | | G06V 20/59 |
| 2020/0234043 A1* | 7/2020 | Shue | | H04N 23/20 |
| 2020/0254615 A1* | 8/2020 | Bryner | | B25J 5/007 |

* cited by examiner

TOP VIEW

ISO VIEW

FRONT VIEW

SIDE VIEW

TOP VIEW

ISO VIEW

FRONT VIEW

TOP VIEW

ISO VIEW

FRONT VIEW

SIDE VIEW

TOP VIEW

ISO VIEW

FRONT VIEW

SIDE VIEW

TOP VIEW

ISO VIEW

FRONT VIEW

SIDE VIEW

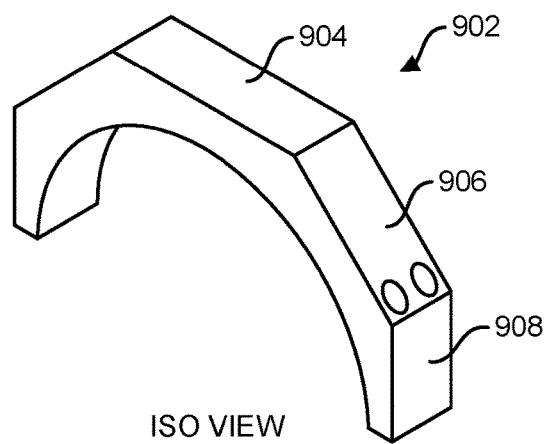
TOP VIEW
FIG. 9A-1
ISO VIEW
FIG. 9A-2
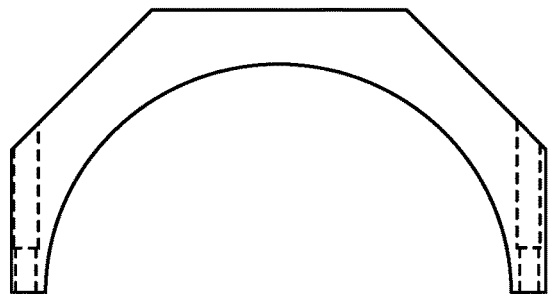
FRONT VIEW
FIG. 9A-3
SIDE VIEW
FIG. 9A-4

TOP VIEW

ISO VIEW

FRONT VIEW

SIDE VIEW

TOP VIEW

ISO VIEW

FRONT VIEW

SIDE VIEW

TOP VIEW

ISO VIEW

FRONT VIEW

SIDE VIEW

TOP VIEW

ISO VIEW

FRONT VIEW

SIDE VIEW

TOP VIEW

ISO VIEW

FRONT VIEW

SIDE VIEW

TOP VIEW

ISO VIEW

FRONT VIEW

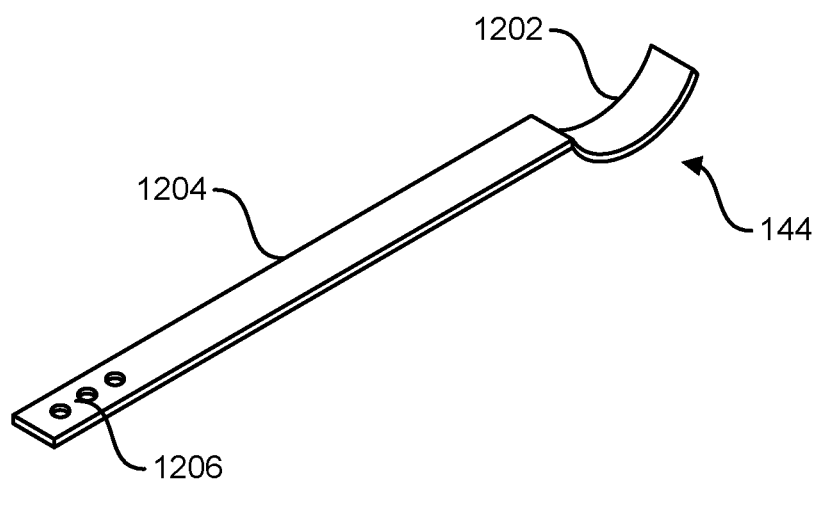
TOP VIEW
FIG. 12A-1
ISO VIEW
FIG. 12A-2
FRONT VIEW
FIG. 12A-3
SIDE VIEW
FIG. 12A-4

TOP VIEW

ISO VIEW

FRONT VIEW

SIDE VIEW

TOP VIEW

ISO VIEW

FRONT VIEW

SIDE VIEW

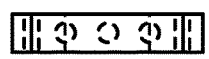
TOP VIEW
FIG. 13B-1
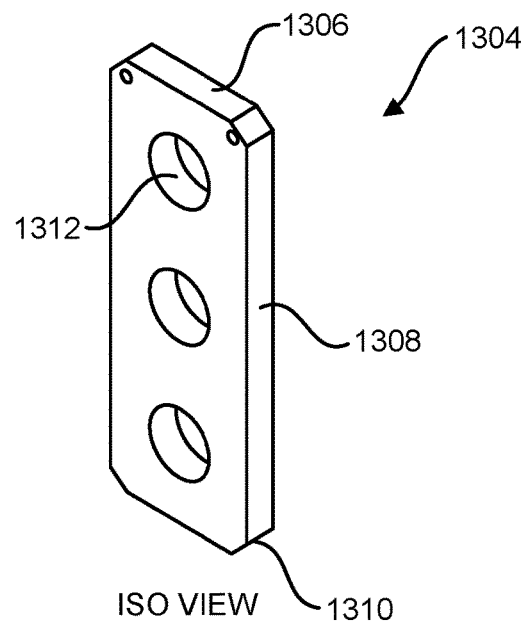
ISO VIEW
FIG. 13B-2
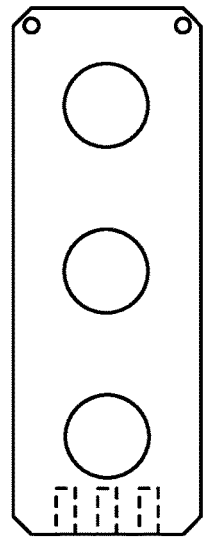
FRONT VIEW
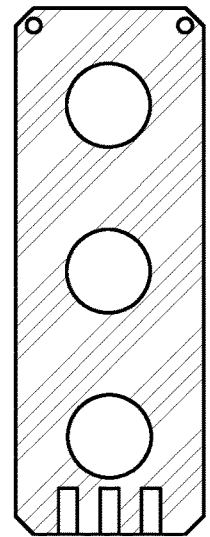
SIDE VIEW
FIG. 13B-3    FIG. 13B-4

NON-DESTRUCTIVE TESTING AND CLEANING APPARATUS

FIELD OF INVENTION

This invention relates to a submersible inspection and cleaning system. More particularly, the present invention relates to a submersible remotely operated vehicle (ROV) used for evaluating the integrity (Ultra sonic thickness measurement) and further cleaning a surface inside a tank, nuclear reactors, fuel tanks, liquid processing equipment, chemical storage tank, or other apparatuses of similar nature.

BACKGROUND

Conventional inspections and cleaning of submerged tanks that are inaccessible for a human involve draining, cleaning with water or solvents, ventilating, containing waste residues, and certifying tanks as gas-free for manned entry. Inspection of the tank bottom, interior structures, and structural coating systems can be carried out only after completion of this series of hazardous, costly, and time-consuming activities. This expensive process can be avoided by using a remotely operated vehicle inspection vehicle submerged in the liquid for inspecting and cleaning the tank.

Remotely operated vehicles (ROVs) are defined as vehicles that are operated underwater and controlled from the surface remotely. The remotely operated vehicle (ROVs) defined as vehicles used for inspection as well cleaning of the submerged surfaces and tanks. The remotely controlled vehicles (ROVs) designed for heavy and hazardous industrial applications. The remotely operated vehicle (ROVs) suitable for underwater cleaning in order to eliminate the need for personnel to enter a submerged environment. The remotely operated vehicle (ROVs) are underwater cleaning system that enables a user to clean bottom of tanks without a human entry. The remotely operated vehicles (ROVs) commonly used for the cleaning of residues in water tanks, fire water tanks, Diesel tanks, jet fuel, Light Crude tanks, Glycol, cooling water tanks and other types of water basins.

The remotely operated vehicle (ROVs) can clean in spaces where human divers cannot, including submerged spaces with toxic chemicals or restricted access. Not only can our customizable machines fit a variety of environments using various augers, pumps, and track configurations, but they can remediate wastewater back into your tank through a closed loop. The result is a safe and efficient system that saves time, reduces liability, and allows you to perform necessary maintenance without taking plants or equipment offline.

Some examples of remotely operated vehicles or robotic cleaner described below. A U.S. Pat. No. 5,947,051 assigned to Michael B. Geiger describes an underwater self-propelled surface-adhering robotically operated vehicle capable of being navigated through a volume of water and of adhering itself to an underwater surface and traversing along the surface. Although, the self-propelled vehicle navigates the underwater environment. However, the patent does not describes the any cleaning action to be performed.

A U.S. Pat. No. 8,989,947 assigned to iRobot Corp describes a sonar system providing improved navigation for a remote vehicle such as a robotic vacuum. Although, the patent described provides improved navigation but the robotic vacuum cleaner does not clean the submerged tank effectively and efficiently.

Another U.S. Pat. No. 10,272,980 discloses a method for performing operations using a water environment robotic system on a target section of pipeline located in an underwater environment. The method includes the steps of deploying the underwater robotic vehicle into the water and visually inspecting the underwater environment to locate the pipeline and its plurality of weld joints. Although a cleaning operation is performed plurality of weld joints using the underwater robotic vehicle. However, the patent described does not inspect the water environment effectively and efficiently.

Another U.S. Pat. No. 8,805,579 assigned to Richard Arthur Skrinde discloses a configurable robotic apparatus that is remotely operable in difficult, hazardous, subterranean, or submerged environs. The apparatus merges diverse disciplines to effect inspecting, cleaning, treating, repairing or otherwise maintaining a wide variety of materials and conditions. The SROV Inspection Tool comprises a variety of sensor hardware and enables flexibility in mounting location. Although the cleaning was accomplished via extendable and rotating cleaning struts fitted with four spinning mechanical scrapers. A debris-processing unit scooped up loosened debris, pulverized it, and ejected it away from the device. However, the robotic apparatus described is inefficient and does not clean the corners of the surfaces effectively.

A U.S. Pat. No. 4,821,665 assigned to Sachse Engineering Associates Inc describes a submersible and remotely operated vehicle (ROVs) for cleaning metallic surfaces. Although the ROVs described uses an ultrasonic probe and a camera for measuring thickness of the metallic surfaces and visual inspection of interior of the metallic surfaces. However, the patent does not clean the interior of the metallic tank efficiently.

The prior art described above discloses a number of robotic or remotely operated vehicles for navigating and cleaning the submerged surfaces or tanks. However, the ROVs described above are inefficient and ineffective.

Therefore, to overcome the shortcomings of the prior-arts, there is a need to provide a cost-effective and efficient remotely operated vehicle that involves non-destructive testing and cleaning of the dry and submerged surfaces. Thus, there is a need to provide a remotely operated vehicle that access structural integrity by accessing the surfaces to clean the surface.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need to provide a video segmentation system that provides better visual effects and seamless experience to a remotely operated vehicle that includes a autonomous navigation system based on data collected by multiple sensors and imaging units.

SUMMARY

In accordance with the present invention, the disadvantages and limitations of the prior art are substantially avoided by providing a remotely operated vehicle (ROV) for non-destructively inspecting and cleaning a surface. The remotely operated vehicle (ROV) inspects and cleans a surface non-destructively. The remotely operated vehicle (ROV) first cleans the surface. Afterwards, the remotely operated vehicle (ROV) inspects the surface.

In one aspect of the present invention, the remotely operated vehicle (ROV) for inspecting and cleaning a surface non-destructively. In addition, the remotely operated vehicle (ROV) includes an inspection module and a cleaning module. The inspection module and the cleaning module slog together to inspect the surface and further clean the surface.

In addition, the inspection module inspects the surface. The inspection module includes a navigation unit and a motorized unit. The navigation unit determines a path along the surface. Further, the motorized unit allows the remotely operated vehicle (ROV) to move in forward direction and in backward direction. Further, the cleaning module provides cleaning action to the remotely operated vehicle cleaning (ROV). In addition, the cleaning module allows the remotely operated vehicle (ROV) to clean the path along the surface. Thereby, the inspecting module and the cleaning module of the remotely operated vehicle (ROV) slog together to inspect the surface and clean the surface.

A primary objective of the present invention is to provide a system for cleaning a surface.

Another objective of the present invention is to provide respective positions of sample points.

Yet another objective of the present invention is to assess structure integrity by assessing one or more of its surfaces.

Yet another objective of the present invention is to provide the remotely operated vehicle (ROV) that is adaptive and flexible.

Further objects of the invention will appear as the description proceeds.

In one aspect of the present invention, the inspection module of the remotely operated vehicle (ROV) is non-destructive inspection unit.

In another aspect of the present invention, the remotely operated vehicle (ROV) is deployed inside a tank.

In yet another aspect of the present invention, the tank is a storage tank and liquid tank storing chemical and alike.

In another aspect of the present invention, the navigation unit scans a surface inside the tank.

In yet another aspect of the present invention, the remotely operated vehicle (ROV) is capable for cleaning one or more dry surfaces.

In another aspect of the present invention, the remotely operated vehicle (ROV) is capable for cleaning one or more submerged surfaces.

In yet another aspect of the present invention, the remotely operated vehicle (ROV) is water-proof.

In another aspect of the present invention, the remotely operated vehicle (ROV) includes a plurality of wheels.

In yet another aspect of the present invention, the motorized unit allows the plurality of wheels to move the remotely operated vehicle (ROV) in forward and in backward.

In another aspect of the present invention, the cleaning action is removal of dust, removal of residue and removal of liquid.

A remotely operated vehicle (ROV) for non-destructively inspecting and cleaning a surface includes an inspection module and a cleaning module. The inspection module further includes a navigation unit and a motorized unit. The navigation unit further includes a transducer for measuring multiple pre-defined parameters of the surface. Further, the navigation unit includes a camera assembly. The camera assembly provides visuals to the navigation unit. Further, the navigation unit includes a sonar erector, which scans obstacles in the path along the surface determined by the navigation unit.

Further, the inspection module includes the motorized unit, which drives the remotely operated vehicle (ROV). In addition, the motorized unit allows the remotely operated vehicle (ROV) to move in forward direction and in backward direction.

In addition, the remotely operated vehicle (ROV) includes the cleaning module. The cleaning module further includes a cleaning pump, a suction hose and a nozzle assembly. The cleaning pump provides a cleaning action to the remotely operated vehicle (ROV). In addition, the cleaning pump enables the remotely operated vehicle (ROV) to perform the cleaning action. Further, the suction hose provides pressure to clean the surface. In addition, the suction hose is associated with the cleaning pump to perform the cleaning action. Further, the nozzle assembly draws residue from the path along the surface. In addition, the nozzle assembly mechanically coupled with the suction hose and the cleaning pump.

Furthermore, the remotely operated vehicle (ROV) connected with a master control unit. The master control unit sends power to the inspection module and the cleaning module. In addition, the master control unit controls the inspecting module and the cleaning module. Thereby, the inspecting module and the cleaning module slog together to inspect the surface and clean the surface.

In one aspect of the present invention, movement speed of the remotely operated vehicle (ROV) is 50 millimeters per second.

In one embodiment of the present invention, the remotely operated vehicle (ROV) includes a GPS system to extrapolate the total displacement of the robot (ROV) from the input voltages of the motors. This is possible because voltage and angular velocity are related. The voltage of each motor is continuously measured, and the measurements sent to a computer using a DAQ (data acquisition) interface. This data used to calculate both the linear and angular velocities for each motor continuously and programmatically, Finally, the calculated velocities used to compute the net displacement of the ROV and plot it in real-time on the computer screen using polar coordinates (r, theta). This method yield good approximations for the live location of the ROV compared to available current method.

In another aspect of the present invention, the parameters are the determination of the thickness of the surface, length of the surface, residue type present on the surface and corrosion status of the surface.

In another aspect of the present invention, the camera-light assembly includes a camera.

In another aspect of the present invention, the camera is a digital camera, action camera, night-visual camera, 360-degree camera and go-pro.

In another aspect of the present invention, the visuals are real-time footage, image, 3-D structure of area and video.

In another aspect of the present invention, the master control unit includes a controller. In another aspect of the present invention, the master control unit includes one or more controller.

In another aspect of the present invention, the control unit is connected with the remotely operated vehicle (ROV) using an umbilical cord.

In another aspect of the present invention, the control unit allows an authentic user to deliver power to various components of the remotely operated vehicle (ROV).

In another aspect of the present invention, the control unit allows the authentic user to provide command to the various components of the remotely operated vehicle (ROV).

In another aspect of the present invention, the master control unit requires 220V AC power.

In another aspect of the present invention, the remotely operated vehicle (ROV) for non-destructively inspecting and cleaning a surface of a tank. In addition, remotely operated vehicle (ROV) includes an inspection module and a cleaning module for inspecting and cleaning the surface. Further, in alternative embodiment of the present invention, the remotely operated vehicle (ROV) may includes a communication module for establishing the communication between the inspection module and the cleaning module.

Further, the inspection module includes a navigation unit, which determines a path along the surface of the tank. The navigation unit further includes a transducer for measuring one or more pre-defined parameters of the surface of the tank, a camera assembly for providing a plurality of visuals to the navigation unit and a sonar erector for scanning a plurality of obstacles in the path determined by the navigation unit.

Further, the inspection module of the remotely operated vehicle (ROV) includes a motorized unit. The motorized unit allows the remotely operated vehicle (ROV) to move in any direction along the surface.

In addition, the remotely operated vehicle (ROV) includes the cleaning module. The cleaning module further includes a cleaning pump, a suction hose and a nozzle assembly. The cleaning pump provides a cleaning action to the remotely operated vehicle (ROV). In addition, the cleaning pump enables the remotely operated vehicle (ROV) to perform the cleaning action. Further, the suction hose provides pressure to clean the surface of the tank. In addition, the suction hose is associated with the cleaning pump to perform the cleaning action. Further, the nozzle assembly draws residue from the path along the surface of the tank. In addition, the nozzle assembly is mechanically coupled with the suction hose and the cleaning pump.

Furthermore, the remotely operated vehicle (ROV) connects with a master control unit. The master control unit sends power to the inspection module and the cleaning module. In addition, the master control unit controls the inspecting module and the cleaning module. Thereby, the inspecting module and the cleaning module slog together to inspect the surface and clean the surface of the tank.

In another aspect, a method inspects and cleans a surface of a tank non-destructively. The method includes several steps to inspect the surface of the tank and further cleans the surface of the tank. The method includes a first step. The first step is to deploy a remotely operated vehicle (ROV) inside the tank. Further, the method includes another step. Another step is to obtain a plurality of pre-defined parameters and a plurality of visuals using one or more sensors. Further, the method includes another step. Another step is to determine a path along with the surface of the tank by a navigation unit. Further, the method includes another step. Another step is to drive the remotely operated vehicle (ROV) on the path along with the surface of the tank. Further, the method includes another step. Another step is to acquire the plurality of pre-defined parameters and the plurality of visuals by a master control unit. Furthermore, the method includes a final step. Final step is to trigger a set of actions by the master control unit to clean the surface of the tank.

In another aspect, a system inspects and cleans a surface non-destructively. The system includes a remotely operated vehicle (ROV) inspects the surface. In addition, remotely operated vehicle (ROV) further includes an inspection module and a cleaning module. The inspection module inspects the surface. The inspection module further includes a navigation unit for determining a path along the surface and a motorized unit for driving the remotely operated vehicle (ROV) in forward direction and in backward direction.

The remotely operated vehicle (ROV) further includes a cleaning module. The cleaning module provides a cleaning action to the remotely operated vehicle cleaning (ROV). In addition, the cleaning module allows the remotely operated vehicle (ROV) to clean the path along the surface.

Further, the remotely operated vehicle (ROV) includes a master control unit. The master control unit is connected to the remotely operated vehicle (ROV) through an umbilical cord for operating and controlling the remotely operated vehicle. The master control unit includes a controller and an electrical distribution board. The controller provides commands to operate the remotely operated vehicle (ROV) for inspecting and cleaning the surface. The electrical distribution board distributes power to the remotely operated vehicle (ROV) based on the commands provided from the controller. Further, the remotely operated vehicle (ROV) works according to the commands provided by the master control unit to inspect and clean the surface.

In another aspect, a system for non-destructively inspecting and cleaning a surface. The system includes a remotely operated vehicle (ROV) for inspecting the surface. The remotely operated vehicle includes an inspection module and a cleaning module.

The inspection module includes a navigation unit for determining a path along the surface. The inspection module further includes a motorized unit. The motorized unit drives the remotely operated vehicle (ROV). In addition, the motorized unit allows the remotely operated vehicle (ROV) to move in forward direction and in backward direction.

The remotely operated vehicle (ROV) further includes a cleaning module. The cleaning module provides a cleaning action to the remotely operated vehicle cleaning (ROV). The cleaning module farther includes a cleaning pump. The cleaning pump provides a cleaning action to the remotely operated vehicle (ROV). The cleaning pump enables the remotely operated vehicle (ROV) to perform the cleaning action. The cleaning pump further includes a suction hose for providing pressure to clean the surface of the tank, a nozzle assembly for drawing residue from the path along the surface of the tank.

In another aspect of the present invention, the master control unit is connected to the remotely operated vehicle (ROV) using umbilical cord.

In another aspect of the present invention, the master control unit authenticates a valid user.

In another aspect of the present invention, the master control unit allows the valid user to send power to the remotely operated vehicle (ROV).

In another aspect of the present invention, the controller provides commands to the modules. In another aspect of the present invention, the master control unit connected to the laptop, computer and mobile phone wirelessly. In another aspect of the present invention, the master control unit connected to the laptop, computer and mobile phone wired connection.

In another aspect of the present invention, the master control unit includes a plurality of buttons. In another aspect of the present invention, the buttons belong to one or more components of inspection module and one or more components of cleaning module.

In another aspect of the present invention, one or more joysticks are provided to control the master control unit.

In another aspect of the present invention, the master control unit controls power supply to the remotely operated vehicle (ROV).

In another aspect of the present invention, the master control unit is a waterproof unit.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6(A2) illustrates a isometric view of the wheel support plate of the remotely operated vehicle (ROV) in accordance with the present invention;

FIG. 6(A3) illustrates a font view of the wheel support plate of the remotely operated vehicle (ROV) in accordance with the present invention;

FIG. 6(A4) illustrates a side view of the wheel support plate of the remotely operated vehicle (ROV) in accordance with the present invention;

FIG. 6(B1) illustrates a top view of a wheel of the remotely operated vehicle (ROV) in accordance with the present invention;

FIG. 6(B2) illustrates a isometric view of the wheel of the remotely operated vehicle (ROV) in accordance with the present invention;

FIG. 6(B3) illustrates a front view of the wheel of the remotely operated vehicle (ROV) in accordance with the present invention;

FIG. 6(B4) illustrates a top view of the wheel of the remotely operated vehicle (ROV) in accordance with the present invention;

FIG. 8(A2) illustrates a isometric view of the top portion of the cam housing of the remotely operated vehicle (ROV) in accordance with the present invention;

FIG. 8(A3) illustrates a front view of the top portion of the cam housing of the remotely operated vehicle (ROV) in accordance with the present invention;

FIG. 8(A4) illustrates a side view of the top portion of the cam housing of the remotely operated vehicle (ROV) in accordance with the present invention;

FIG. 8(B1) illustrates a top view of a bottom portion of a cam housing of the remotely operated vehicle (ROV) in accordance with the present invention;

FIG. 8(B2) illustrates a isometric view of the bottom portion of the cam housing of the remotely operated vehicle (ROV) in accordance with the present invention;

FIG. 8(B3) illustrates a front view of the bottom portion of the cam housing of the remotely operated vehicle (ROV) in accordance with the present invention;

FIG. 8(B4) illustrates a side view of the bottom portion of the cam housing of the remotely operated vehicle (ROV) in accordance with the present invention:

FIG. 9(A2) illustrates a isometric view of the top portion of the inspection module VS Motor top clamp of the remotely operated vehicle (ROV) in accordance with the present invention:

FIG. 9(A3) illustrates a front view of the top portion of the inspection module VS Motor top clamp of the remotely operated vehicle (ROV) in accordance with the present invention;

FIG. 9(A4) illustrates a side view of the top portion of the inspection module VS Motor top clamp of the remotely operated vehicle (ROV) in accordance with the present invention;

FIG. 9(B1) illustrates a top view of a bottom portion of the inspection module VS Motor top clamp of the remotely operated vehicle (ROV) in accordance with the present invention;

FIG. 9(B2) illustrates a isometric view of the bottom portion of the inspection module VS Motor top clamp of the remotely operated vehicle (ROV) in accordance with the present invention:

FIG. 9(B3) illustrates a front view of the bottom portion of the inspection module VS Motor top clamp of the remotely operated vehicle (ROV) in accordance with the present invention;

FIG. 9(B4) illustrates a side view of the bottom portion of the inspection module VS Motor top clamp of the remotely operated vehicle (ROV) in accordance with the present invention;

FIG. 10(A2) illustrates a isometric view of conversion nozzle of a nozzle assembly of the remotely operated vehicle (ROV) in accordance with the present invention;

FIG. 10(A3) illustrates a front view of the conversion nozzle of a nozzle assembly of the remotely operated vehicle (ROV) in accordance with the present invention;

FIG. 10(A4) illustrates a side view of the conversion nozzle of a nozzle assembly of the remotely operated vehicle (ROV) in accordance with the present invention;

FIG. 10(B1) illustrates a top view of a nozzle end of a nozzle assembly of the remotely operated vehicle (ROV) in accordance with the present invention;

FIG. 10(B2) illustrates a isometric view of the nozzle end of the nozzle assembly of the remotely operated vehicle (ROV) in accordance with the present invention;

FIG. 10(B3) illustrates a front view of the nozzle end of the nozzle assembly of the remotely operated vehicle (ROV) in accordance with the present invention;

FIG. 10(B4) illustrates a side view of the nozzle end of the nozzle assembly of the remotely operated vehicle (ROV) in accordance with the present invention;

FIG. 10(C1) illustrates a top view of a nozzle clamp of a nozzle assembly of the remotely operated vehicle (ROV) in accordance with the present invention;

FIG. 10(C2) illustrates a isometric view of the nozzle clamp of the nozzle assembly of the remotely operated vehicle (ROV) in accordance with the present invention;

FIG. 10(C3) illustrates a front view of the nozzle clamp of the nozzle assembly of the remotely operated vehicle (ROV) in accordance with the present invention;

FIG. 10(C4) illustrates a side view of the nozzle clamp of the nozzle assembly of the remotely operated vehicle (ROV) in accordance with the present invention;

FIG. 10(D1) illustrates a top view of a back pump clamp of the remotely operated vehicle (ROV) in accordance with the present invention;

FIG. 10(D2) illustrates a isometric view of the back pump clamp of the remotely operated vehicle (ROV) in accordance with the present invention;

FIG. 10(D3) illustrates a front view of the back pump clamp of the remotely operated vehicle (ROV) in accordance with the present invention;

FIG. 10(D4) illustrates a side view of the back pump clamp of the remotely operated vehicle (ROV) in accordance with the present invention;

FIG. 12(A2) illustrates a isometric view of the vac-holder of the remotely operated vehicle (ROV) in accordance with the present invention;

FIG. 12(A3) illustrates a front view of the vac-holder of the remotely operated vehicle (ROV) in accordance with the present invention;

FIG. 12(A4) illustrates a side view of the vac-holder of the remotely operated vehicle (ROV) in accordance with the present invention;

FIG. 12(B1) illustrates a top view of a vac-bottom clamp of the remotely operated vehicle (ROV) in accordance with the present invention;

FIG. 12(B2) illustrates a isometric view of the vac-bottom clamp of the remotely operated vehicle (ROV) in accordance with the present invention;

FIG. 12(B3) illustrates a front view of the vac-bottom clamp of the remotely operated vehicle (ROV) in accordance with the present invention;

FIG. 12(B4) illustrates a side view of the vac-bottom clamp of the remotely operated vehicle (ROV) in accordance with the present invention;

FIG. 13(A2) illustrates a isometric view of the top plate of the transducer block of the remotely operated vehicle (ROV) in accordance with the present invention;

FIG. 13(A3) illustrates a front view of a top plate of a transducer block of the remotely operated vehicle (ROV) in accordance with the present invention;

FIG. 13(A4) illustrates a side view of the top plate of the transducer block of the remotely operated vehicle (ROV) in accordance with the present invention;

FIG. 13(B1) illustrates a top view of a side plate of a transducer block of the remote operated vehicle (ROV) in accordance with the present invention;

FIG. 13(B2) illustrates a isometric view of the side plate of the transducer block of the remotely operated vehicle (ROV) in accordance with the present invention;

FIG. 13(B3) illustrates a front view of the side plate of the transducer block of the remotely operated vehicle (ROV) in accordance with the present invention;

FIG. 13(B4) illustrates a side view of the side plate of the transducer block of the remotely operated vehicle (ROV) in accordance with the present invention;

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Figure 1:
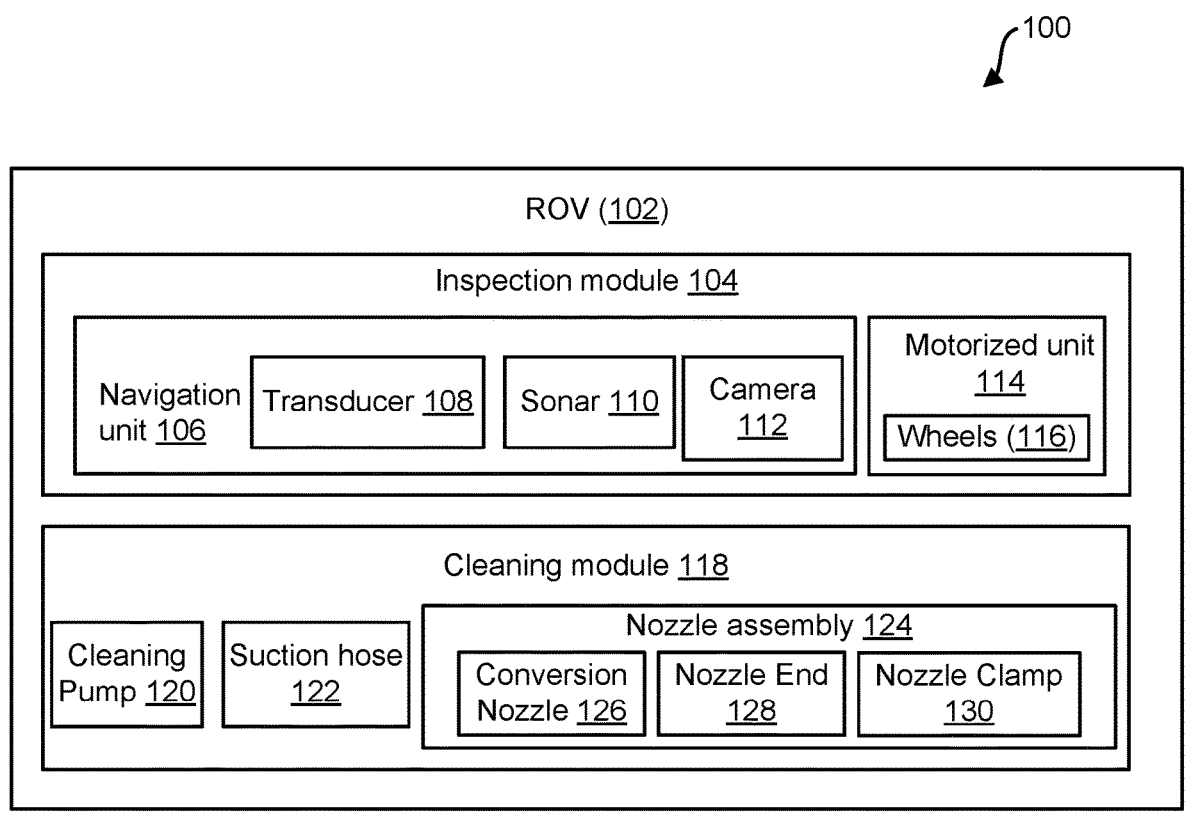
FIG. 1 illustrates a system diagram of a remotely operated vehicle (ROV) in accordance with the present invention.

FIG. 1 illustrates a view of a system (100) diagram of a remotely operated vehicle (ROV) (102) that utilized for inspecting a surface and further cleaning the surface. The remotely operated vehicle (ROV) (102) inspects and cleans along the surface non-destructively. In general, the remotely operated vehicle (ROV) (102) inspects a dirty region and cleans the dirty region non-destructively. The remotely operated vehicle (ROV) (102) inspects and cleans sub-merged surfaces, tanks, pools, oil tank and the like.

The remotely operated vehicle (ROV) (102) includes an inspection module (104) for inspecting and further determining a path along the surface to be cleaned. The inspection module (104) associated with the remotely operated vehicle (ROV) (102) further includes a navigation unit (106) that with the help of sensors and visuals acquiring units determines the path, in which cleaning is required.

The navigation unit (106) further includes a transducer (108) to measure pre-defined parameters of the surface. The pre-defined parameters of the surface may be thickness of the surface, length of the surface, residue type present on the surface and corrosion status of the surface and the like. In one aspect of the invention, the transducer (108) may be either ultrasonic, sonar, thermal, piezoelectric and the like. In one another aspect of the present invention, the multiple transducer (108) may be used for scanning multiple parameter associated with the surface. The parameters may be dust, thickness of dust, corrugations, irregularities and alike associated with the surface.

Further, the navigation unit (106) further includes a sonar (110) for scanning obstacles in the path along the surface. The obstacles may not be limited to stone, block and any other type of obstruction that prevents the remotely operated vehicle (102) to move on the path along the surface.

Further, the navigation unit (106) further includes a camera (112) for providing a number of visuals to the navigation unit (106). The camera (112) is used to provide real-time visual to the navigation unit (106) that makes the remotely operated vehicle (102) to move on the surface in order to clean the surface without any resistance Further, the inspection module (104) includes a motorized unit (114) for driving the remotely operated vehicle (102). In addition, the motorized unit (114) allows the remotely operated vehicle (102) to move in any direction including forward direction, backward direction, corners and the like. The motorized unit (114) further equipped with multiple wheels (116a, 116b, 116c, 116d) in order to vary the directional movement and scanning patterns of the remotely operated vehicle (102) with respect to the bottom surface of the pool or the tank being cleaned.

The remotely operated vehicle (102) further includes a cleaning module (118) configured for cleaning the surface. Further, the cleaning module (118) further includes a cleaning pump (120) for providing cleaning action to the remotely operated vehicle (102). Further, the cleaning module (118) further includes a suction hose (122) configured for creating suctioning pressure to clean the path along the surface. In addition, the suction hose (122) is associated with the cleaning pump (120) to perform cleaning action.

Further, the cleaning module (118) includes a nozzle assembly (124) that configured for drawing residue from the path along the surface. The nozzle assembly (124) mechanically coupled with the suction hose (122) and the cleaning pump (120) to provide the cleaning action for cleaning the surface. The cleaning action is removal of dust, removal of residue and removal of liquid from the surfaces.

The nozzle assembly (124) further includes a conversion nozzle (126), a nozzle end (128) and a nozzle clamp (130). The nozzle end (128) draws the residue from the surface and the path along the surface. The nozzle end (128) further cleans the surface and the path along the surface. In addition, the conversion nozzle (126) enables the nozzle end (128) to draw the residue from the surface and the path along the surface. The nozzle clamp (130) connected on top end of the nozzle end (128). The nozzle clamp (134) provides support to the nozzle end (128) from the top end.

In one aspect of the present invention, the remotely operated vehicle (ROV) (102) further includes sensors for monitoring predefined parameters and conditions prevailing in the tank, pool and the like. The predefined parameters either, gas pressure, gas level, verifies position of the ROV inside the tank, verifies working conditions of the inspection module, the navigation unit, cleaning module and movement speed and direction of the ROV (102).

The remotely operated vehicle (ROV) (102) assess storage tank integrity by assessing integrity of multiple surfaces. In addition, the remotely operated vehicle (ROV) (102) assess integrity of storage tank. In one aspect of the present invention, the storage tank may contain intermediate process products, gasoline, condensate, demin, water, diesel, fresh water, fire water, liquid grade products, glycols, jet fuel, kerosene, lube oil, mild acids, mineral oil, olefin-water, acetic anhydride, alcohol's, bis (2-ethylhexyl) db bunker c (#6 fo), diesel low sulphur dimethyl-propanediol, di-2-ethylhexyl adipate dpm eastman dbp/dep/dibk/dop, eastman eb/pg/n-butanol/txib, ethylene glycol monopropyl ether, ethyl 3 ethoxyproprionate, hexane, crude oil, hexanol, methyl-ethyl ketone (mek), methanol, methyl-n-amyl ketone, naphtha, n-butyl alcohol, n polymeric (mdi), phenyl isocyanate (phenco), p-p-diaminodiphenyl methane, propylene glycol monomethyl, propylene glycol, polybutenesocium, hydrocide spirits, terephathalante tpm, water salts, 2-ethyl hexanol, 2-butoxyethil acetate, isobytyl: isobutyrate, 2,2,4-trimethyl 1,3 pentanedic, 2-et, 2,2 dimethyl-1,3-propenediol and the like.

Figure 2:
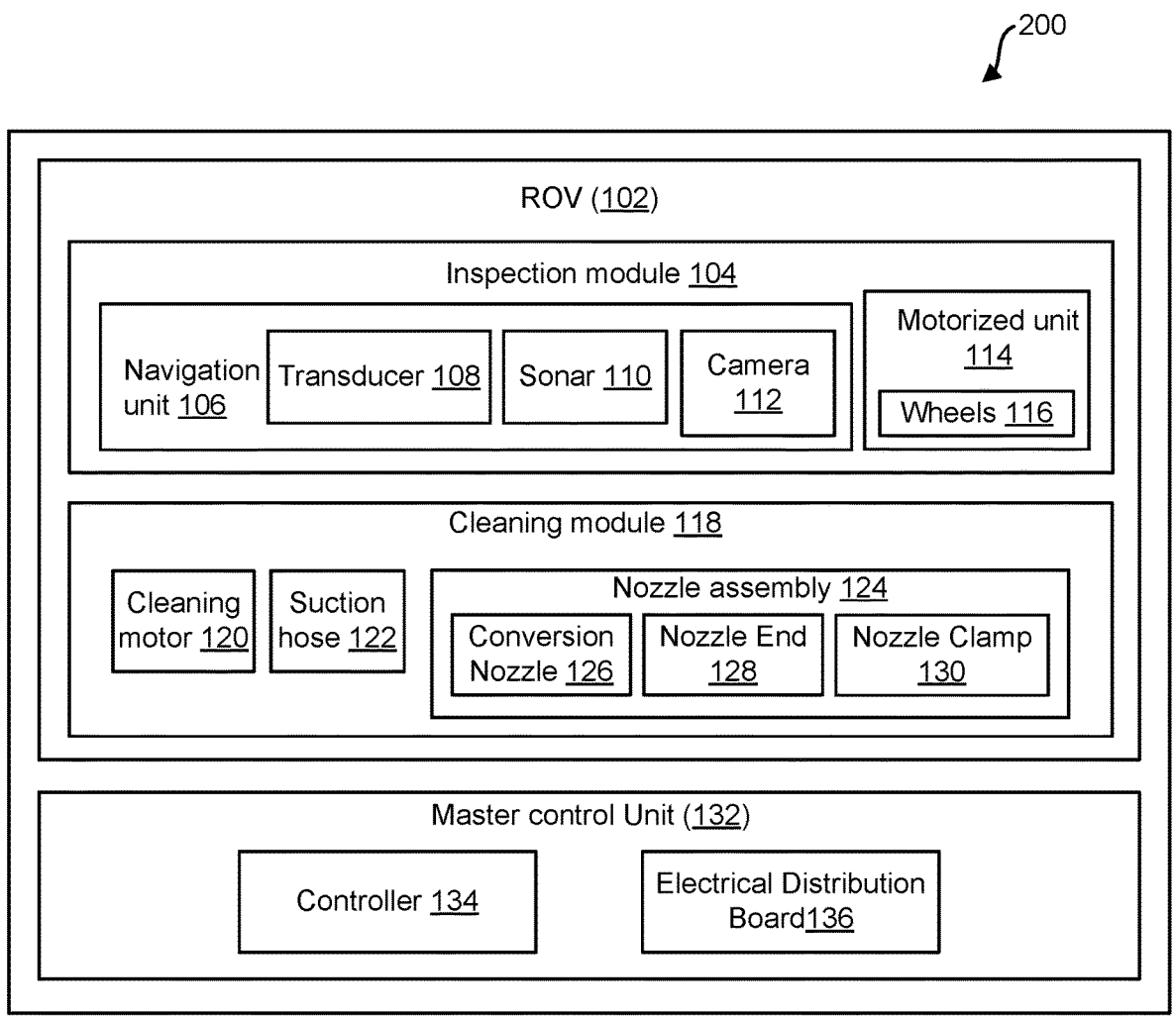
FIG. 2 illustrates a system diagram of the remotely operated vehicle (ROV) controlled by a master control unit externally in accordance with the present invention.

FIG. 2 illustrates a system (200) for non-destructively inspecting and cleaning a surface. The system (200) includes a remotely operated vehicle (ROV) (102) as illustrated in detail in FIG. 1 and a master control unit (132) for controlling the remotely operated vehicle (ROV) (102) externally.

The master control unit (132) may be a control room providing power supply to the remotely operated vehicle (ROV) (102) and monitoring the state of the ROV (102). The remotely operated vehicle (ROV) (102) connected with a master control unit (132) through wired or wireless connection. In one aspect of the present invention, the remotely operated vehicle (ROV) (102) connected through umbilical cord to the master control unit (132).

The master control unit (132) further includes a controller (134) for providing commands to operate the remotely operated vehicle (ROV) (102) for inspecting and cleaning the surface. Further, the master control unit (132) includes an electrical distribution board (136) for processing the commands provided by the controller (134) to inspect and clean the surface.

The master control unit (132) further connected with multiple computing devices through wired or wireless connection to the remotely operated vehicle (ROV) (102). The computing device may be any computing device including laptop, phone and the like. The computing devices verifies and authenticates the position and function of each of the sensors, the inspection module and the cleaning module and other sub components of the remotely operated vehicle (ROV) (102).

The several computing devices may not be limited to computer, laptop, mobile phone, and tablets. In an embodiment, the remotely operated vehicle (ROV) (102) connected with the several computing devices through wireless connection. The wireless connection may be Bluetooth, infrared, NFC, Wi-Fi and the like. In another embodiment, the remotely operated vehicle (ROV) (102) connected with the several computing devices through wired connections. The wired connection may not be limited to coaxial cable, twisted pair cable and the like.

The master control unit (132) includes a multiple buttons and joy-sticks for controlling the inspection module (104), the navigation unit (106) and the cleaning module (118). In one aspect of the present invention, the master control unit (132) further includes an authentication unit for authenticating and verifying the identity of a user, an employer that may operate the ROV (102) to clean the submerged surfaces, pools, tanks and the like.

Figure 3A:
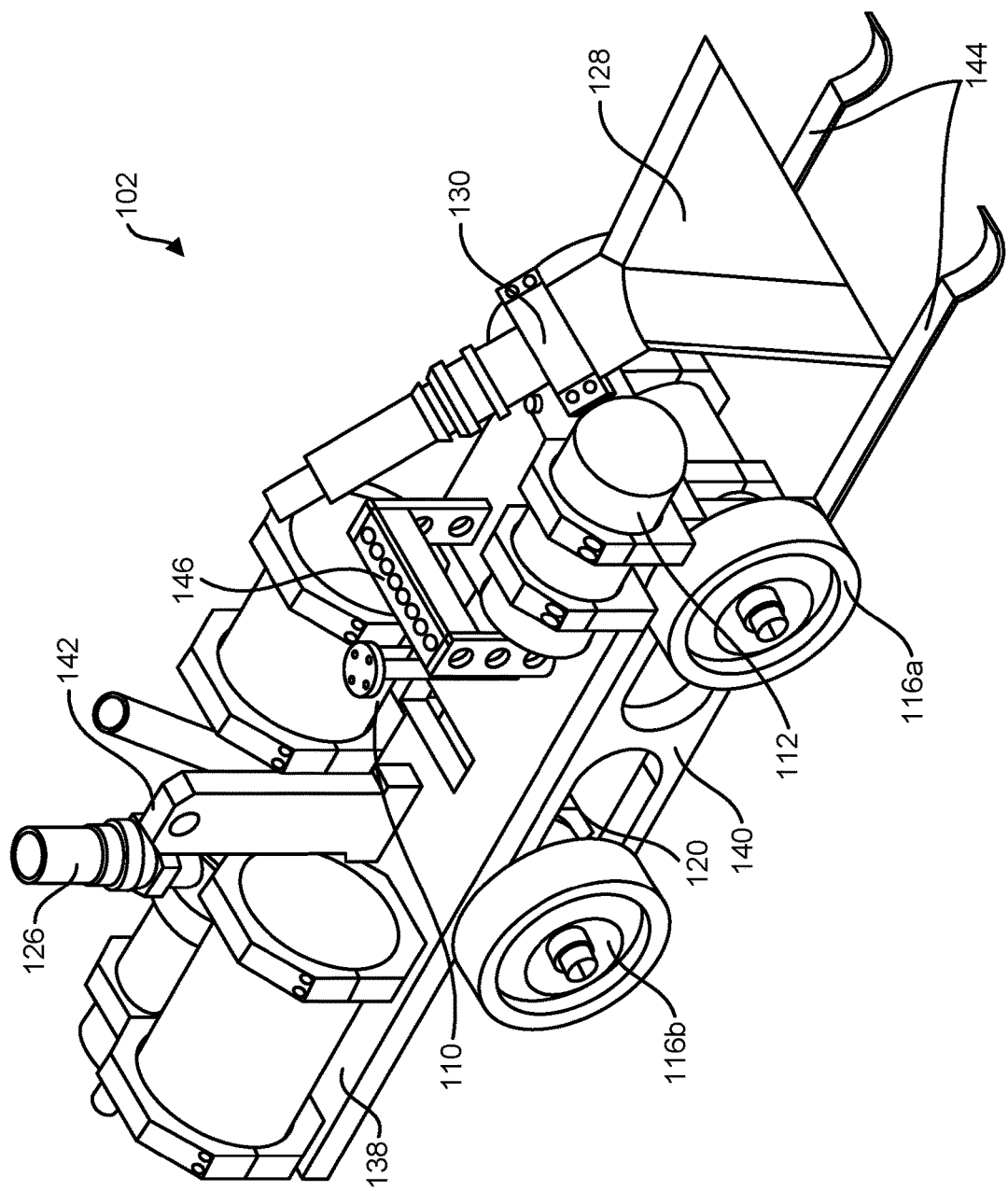
FIG. 3(A) illustrates a perspective view of the remotely operated vehicle (ROV) in accordance with the present invention.

FIG. 3A illustrates a perspective view of the remotely operated vehicle (ROV) (102) for inspecting and cleaning the submerged surfaces. The remotely operated vehicle (ROV) (102) includes an inspection module (104) and a cleaning module (118). In one alternative embodiment of the present invention, the remotely operated vehicle (ROV) (102) may include a communication module for establishing communication between the inspection module (104) and the cleaning module (118).

The remotely operated vehicle (ROV) (102) inspects and cleans along the surface non-destructively. In general, the remotely operated vehicle (ROV) (102) inspects a dirty region and cleans the dirty region non-destructively. The remotely operated vehicle (ROV) (102) inspects and cleans submerged surfaces, tanks, pools, oil tank and the like.

The remotely operated vehicle (ROV) (102) includes an inspection module (104) for inspecting and further determining a path along the surface to be cleaned. The inspection module (104) associated with the remotely operated vehicle (ROV) (102) further includes a navigation unit (106) that with the help of sensors and visual acquiring units determines the path, in which cleaning is required.

The navigation unit (106) further includes a transducer (108) to measure pre-defined parameters of the surface. The pre-defined parameters of the surface may be thickness of the surface, length of the surface, residue type present on the surface and corrosion status of the surface and the like. In one aspect of the invention, the transducer may be either ultrasonic, sonar, thermal, piezoelectric and the like. In one another aspect of the present invention, the multiple transducer may be used for scanning pre-defined parameter of the surface.

In addition, the remotely operated vehicle (ROV) (102) further includes the transducer (108), the camera (110) and the sonar erector (112). The transducer (108) is fixed on the base plate (138) using multiple bolts and screws. The transducer (108) measures one or more pre-defined parameters corresponding to the surface. In general, a transducer (108) is any device that converts one form of energy into a readable signal. In addition, many transducers (108) includes an input that is then converted to a proportional electrical signal. In addition, multiple common inputs include energy, torque, light, force, position, acceleration, and other physical properties.

In an embodiment, the transducer (108) utilized may be an ultrasonic transducer. In addition, the ultrasonic transducer is a device that is used to convert one type of energy into an ultrasonic vibration. In general, ultrasonic cleaning systems are composed of a signal generator, an ultrasonic transducer and a cleaning tank. The transducer (108) changes the electrical high-frequency signal from the generator into ultrasonic sound waves in the cleaning solution. The one or more pre-defined parameters are thickness of the surface, corrosion on the surface, residue type present on the surface, length of the surface.

Further, the navigation unit (106) further includes a sonar (110) for scanning obstacles in the path along the surface. The obstacles may not be limited to stone, block and any other type of obstruction that prevents the remotely operated vehicle (102) to move on the path along the surface.

The sonar (110) is fixed on the base plate (138) of the remotely operated vehicle (ROV) (102). In general, sonar is a technique that uses sound propagation to navigate, measure distances, communicate with or detect objects on or under the surface of the water, such as other vessels. In an example, the plurality of obstacles may be less frictional surface, obstruction in the path by solid substances, walls, grease in the path along the surface and the like.

Further, the navigation unit (106) includes a camera (11) for providing visuals to the navigation unit (106). The camera (112) is used to provide real-time visual to the navigation unit (106) that makes the remotely operated vehicle (102) to move on the surface in order to clean the surface without any resistance The camera (112) is fixed to the base plate (138) of the remotely operated vehicle (ROV) (102) using the multiple bolts and screws. The camera (112) provides a number of visuals to the navigation unit (106) that further guides the remotely operated vehicle (ROV) (102) to follow the path along the surface and clean the path along the surface. The camera (112) includes a camera. In an example, the camera (112) may be a digital camera, action camera, night-visual camera, 360-degree camera, go-pro, dome camera, bullet type camera, c-mount camera, infrared camera, varifocal camera, compact camera, mirrorless camera and the like.

The camera (112) provides visuals to the navigation unit (106) that further guides the remotely operated vehicle (ROV) (102) to follow the path along the surface and clean the path along the surface. The visuals are real-time footage, image, 3D structure of the area, video and the like.

The camera (112) is attached to the remotely operated vehicle (ROV) (102) either in a wired configuration or in a wireless configuration. In an example, the wired configuration includes two main types of fiber optic cables. The fiber optic cables include single mode fiber and multi-mode fiber. In another example, the wireless configuration may be Bluetooth configuration, mac configuration, Wi-Fi configuration, infrared configuration and the like. In one embodiment, the camera (112) further inserted in a housing and further supported by multiple clamps on both lower and upper sides.

Further, the inspection module (104) includes a motorized unit (114) for driving the remotely operated vehicle (102). In addition, the motorized unit (114) allows the remotely operated vehicle (102) to move in any direction including forward direction, backward direction, corners and the like. The motorized unit (114) further equipped with multiple wheels (116a, 116b, 116c, 116d) in order to vary the directional movement and scanning patterns of the remotely operated vehicle (102) with respect to the bottom surface of the pool or the tank being cleaned.

The each pair of pair of wheels (116a, 116b, 116c, 116d) are attached to each plate of the base plate to wheel plate. The each plate of the base to wheel plate is attached with the base plate using the multiple bolts and screws. The each plate of the base to wheel plate is attached with the base plate along longitudinal opposite sides of the base plate. The wheel to base plate is made up of solid material. The solid material may be copper, iron, aluminum, nickel, cobalt and the like. In general, the base to wheel plate is made up of sheet of metal forming a support for the pair of pair of wheels.

In addition, the each wheel (116a, 116b, 116c, 116d) in the pair of pair of wheels includes a wheel rim and a rubber wheel. The wheel rim may made up of stainless steel material, iron, copper, nickel, aluminum, cobalt and the like. The pair of wheel allows the remotely operated vehicle (ROV) (102) to move in forward direction or in backward direction. The pair of wheels (116a, 116b, 116c, 116d) are connected with a motor.

The remotely operated vehicle (102) further includes a cleaning module (118) configured for cleaning the surface. Further, the cleaning module (118) further includes a cleaning pump (120) for providing cleaning action to the remotely operated vehicle (102). The cleaning pump (120) enables the remotely operated vehicle (ROV) (102) to perform the cleaning action. The cleaning pump (120) fixed below the base plate using the multiple bolts and screws. The cleaning pump (120) enables the remotely operated vehicle (ROV) (102) to perform the cleaning action. The cleaning pump (120) fixed below the base plate using the multiple bolts and screws.

Further, the cleaning module (118) further includes a suction hose (122) configured for creating suctioning pressure to clean the path along the surface. In addition, the suction hose (122) is associated with the cleaning pump (120) to perform cleaning action. Further, the suction hose (122) provides pressure to clean the surface and the path along the surface. The suction hose (122) further includes a pump that provides pressure and create vacuum to clean the surface. The suction hose (122) is mechanically coupled with the cleaning pump (120) and the nozzle assembly (124).

Further, the cleaning module (118) includes a nozzle assembly (124) that configured for drawing residue from the path along the surface. The nozzle assembly (124) mechanically coupled with the suction hose (122) and the cleaning pump (120) to provide the cleaning action for cleaning the surface. The cleaning action is removal of dust, removal of residue and removal of liquid from the surfaces.

The nozzle assembly (124) further includes a conversion nozzle (126), a nozzle end (128) and a nozzle clamp (130). The nozzle end (128) draws the residue from the surface and the path along the surface. The nozzle end (128) further cleans the surface and the path along the surface. In addition, the conversion nozzle (126) enables the nozzle end (128) to draw the residue from the surface and the path along the surface. The nozzle clamp (130) connected on top end of the nozzle end (128). The nozzle clamp (130) provides support to the nozzle end (128) from the top end.

Further, the remotely operated vehicle (ROV) (102) includes an inspection housing. The inspection housing is fixed on the base plate (138) of the remotely operated vehicle (ROV) (102) using an inspection vs motor bottom and an inspection vs motor top.

Further, the remotely operated vehicle (ROV) (102) further includes a cable holder base along with a pair of cable holder-sides. The cable holder base is attached with the pair of cable holder-sides using the multiple bolts and screws. The pair of cable holder-sides are fixed on the base plate of the remotely operated vehicle (ROV) (102) using the multiple bolts and screws. The pair of cable holder-sides and the cable holder base are utilized to accommodate and safeguard multiple cables used in the remotely operated vehicle (ROV) (102).

The remotely operated vehicle (ROV) (102) includes a master control unit (132) for establishing communication with the inspection module (104) and the cleaning module (118) for inspecting and cleaning the surface.

Further, the master control unit (132) includes an electrical power distributer (136) to operate the remotely operated vehicle (ROV) (102) for inspecting and cleaning the surface. In addition, the movement speed of the remotely operated vehicle (ROV) is 50 millimeters per second.

In an embodiment, the remotely operated vehicle (ROV) (102) utilized to clean a particular surface. The remotely operated vehicle (ROV) (102) is capable to perform Various types of cleaning actions. In an example, various types of cleaning actions may not be limited to dry cleaning, dusting, and water cleaning, pressure washing, vacuum cleaning, spray cleaning and alike.

The remotely operated vehicle (ROV) (102) inspects the surface non-destructively. The remotely operated vehicle (ROV) (102) cleans the surface non-destructively. The remotely operated vehicle (ROV) (102) is capable to inspect and clean surface with ambient temperature lies in range of −10° C. to +56° C.

Figure 3B:
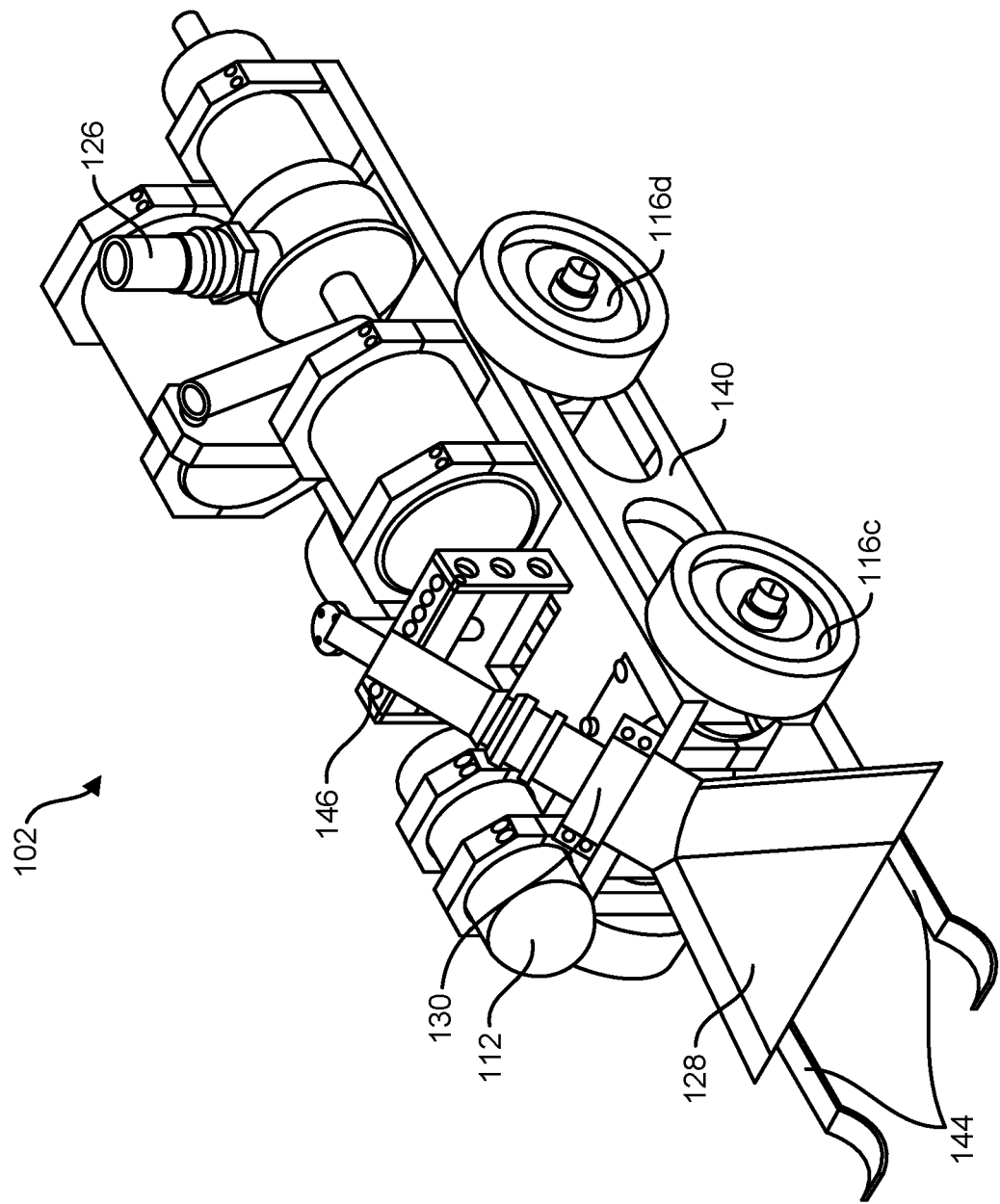
FIG. 3(B) illustrates a perspective side view of the remotely operated vehicle (ROV) in accordance with the present invention.

FIG. 3B illustrates a cross-sectional view of front side of the remotely operated vehicle (ROV) (102). The cross-sectional focusses on the nozzle assembly (124). The nozzle assembly (124) is fixed on the base plate (138) using the multiple bolts and screws. The nozzle assembly (124) further includes a nozzle end (128) and a conversion nozzle (126). The nozzle end (128) draws the residue from the surface and the path along the surface. The nozzle end (128) further cleans the surface and the path along the surface. In addition, the conversion nozzle (126) enables the nozzle end (128) to draw the residue from the surface and the path along the surface.

Further, the FIG. 3(B) focusses on the wheel plate (140). The wheel (116a, 116b, 116c, 116d) to the base plate (138) is attached with the base plate (138) corresponding to longitudinal opposite sides of the base plate (138) using the multiple bolts and screws. In addition, each of the base plate (138) to the wheel plate (140) includes a pair of indentations to accommodate the each pair of wheels (116a, 116b, 116c, 116d). The each pair of wheels (116a, 116b, 116c, 116d) are attached with the each pair of base to wheel plate in order to move the remotely operated vehicle (ROV) (102) in forward and in backward direction.

Figure 4A:
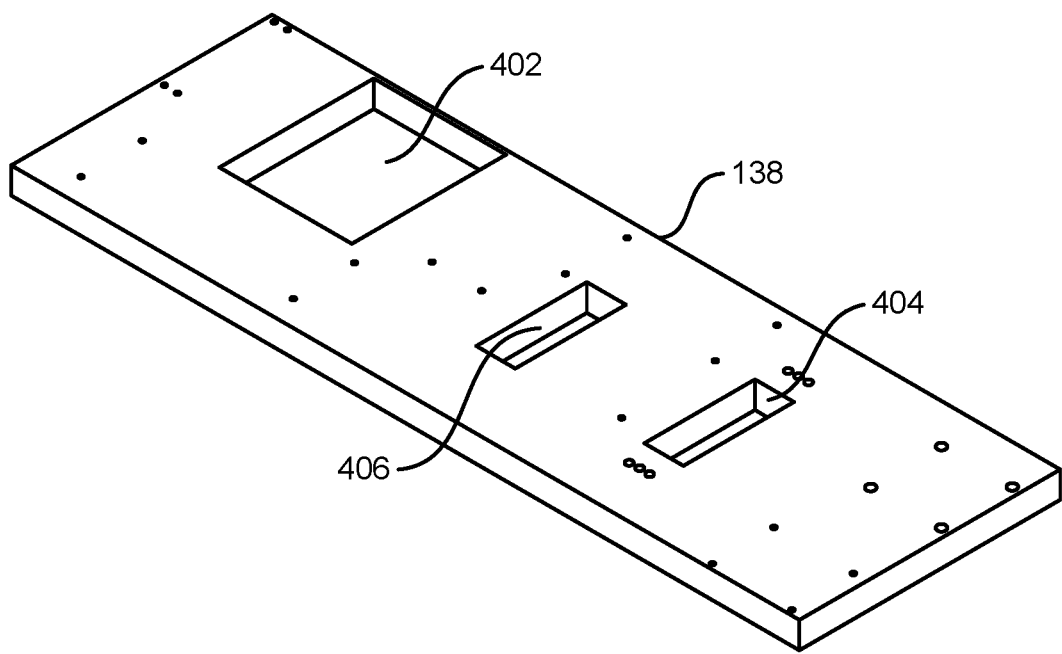
FIG. 4(A) illustrates a perspective view of a base plate of the remotely operated vehicle (ROV) in accordance with the present invention.

FIG. 4(A) illustrates the isometric view of the base plate (138) respectively. The remotely operated vehicle (ROV) (102) includes the base plate (138) to hold the sub units of the multiple modules such as navigation unit and the like. Further, the base plate (138) includes a multiple indentations to hold the sub units of the multiple modules.

Further, the base plate (138) include front side, back side and a pair of parallel sides. The base plate (138) attached with a pair of wheel plates (140a,140b) on longitudinal sides. The pair of wheel plates (140a, 140b) further attached with the base plate (138) along a pair of longitudinal sides of the base plate. The base plate (138) may be made of any material. In an example, the base plate (138) may be made of copper, iron, aluminum, nickel, cobalt and the like. In general, the base plate (138) made up of sheet of metal forming the bottom of an object. The base plate (138) acts a chassis for the remotely operated vehicle (ROV) (102).

The base plate (138) includes multiple indentation (402, 404, 406) that accommodates sub units of the multiple modules. The multiple modules are the inspection module (104) and the cleaning module (118). The sub units of inspection module (104) are the navigation unit (106) and the motorized unit (114). Further, the sub units of the cleaning module (118) are the cleaning pump (120), the suction hose (122) and the nozzle assembly (124).

Figure 4B:
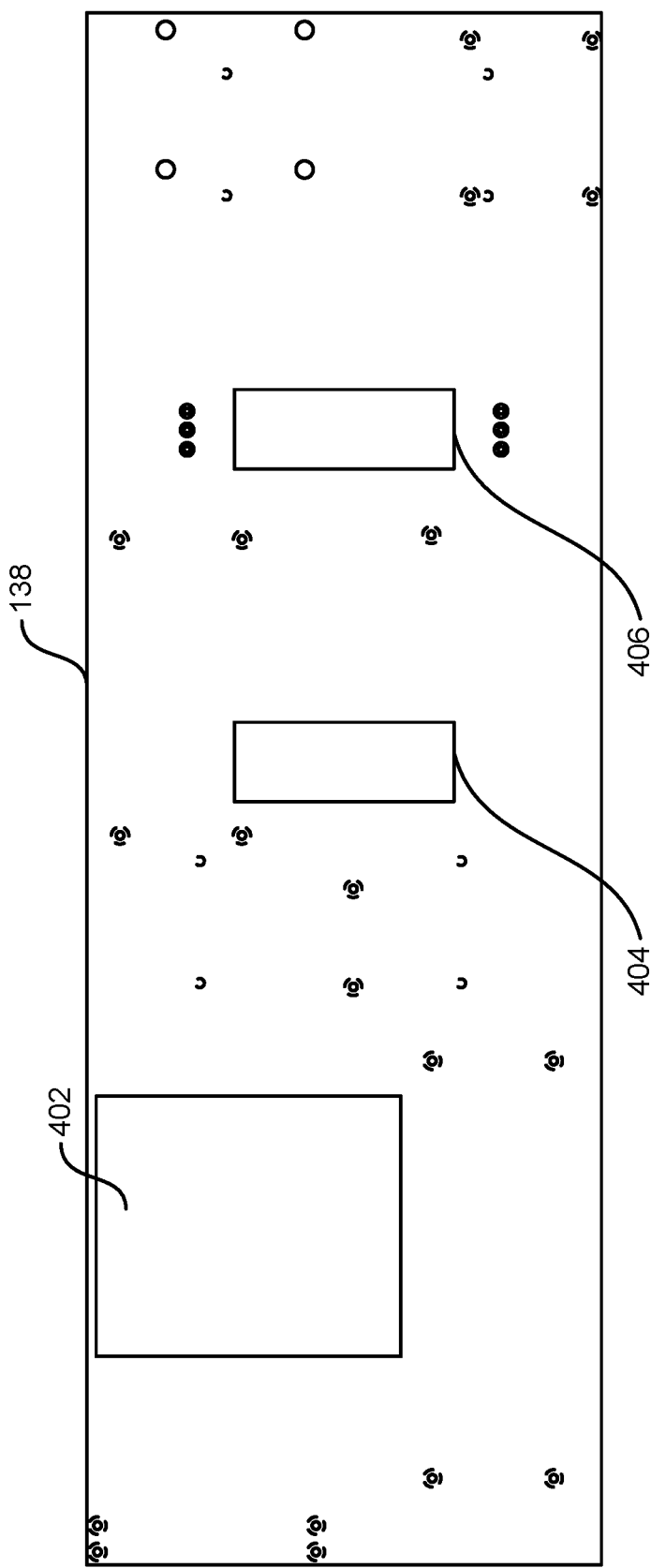
FIG. 4(B) illustrates a front view of the base plate of the remotely operated vehicle (ROV) in accordance with the present invention.

FIG. 4(B) illustrates a front view of the base plate (138) configured for accommodating the inspection module (104) and the cleaning module (118). The indentation (402) holds the conversion nozzle of the nozzle assembly (122). The indentation (404) holds the sonar (110) and further the indentation (406) holds the camera (112) that provides visuals to the ROV (102). Further, the inspection module (104) and the cleaning module (118) are fixed to the base plate (138) through connection means such as screws, bolts, and the like.

Figure 5A:
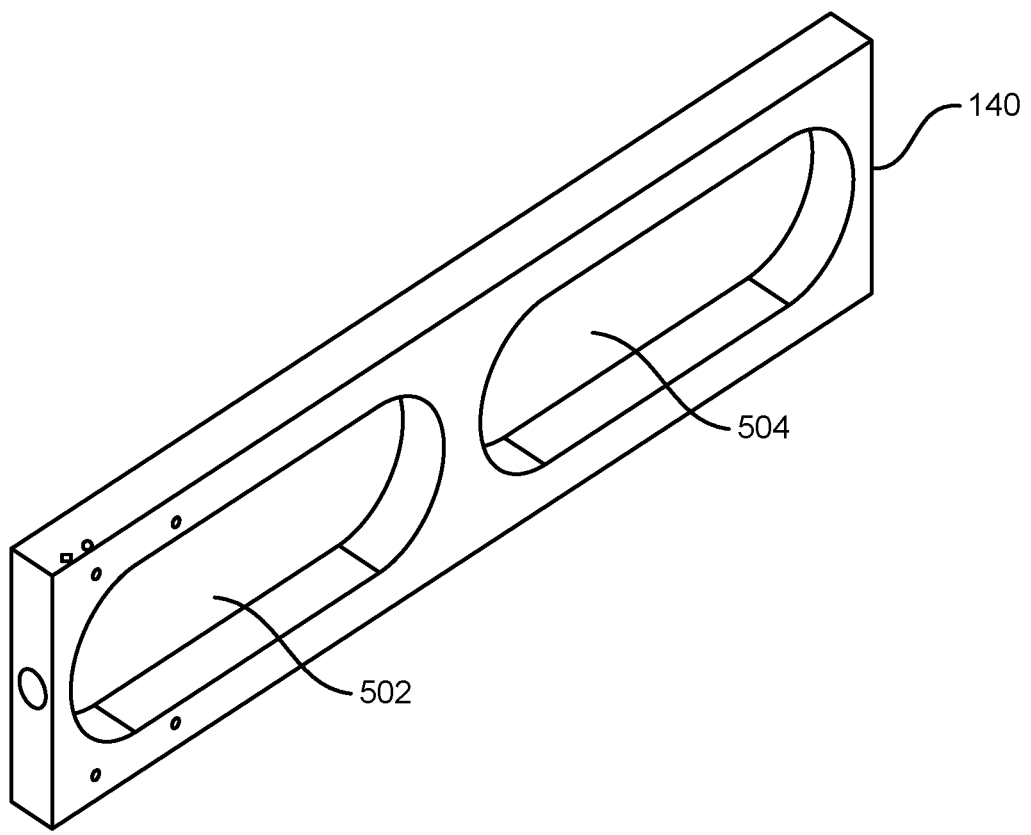
FIG. 5(A) illustrates a perspective view of a wheel plate of the remotely operated vehicle (ROV) in accordance with the present invention.
Figure 5B:
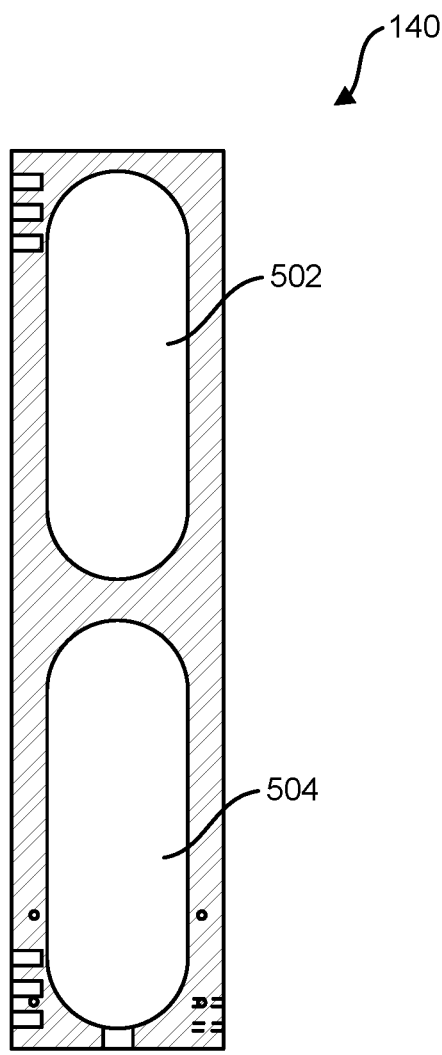
FIG. 5(B) illustrates a front view of the wheel plate of the remotely operated vehicle (ROV) in accordance with the present invention.
Figures 1, 6A:
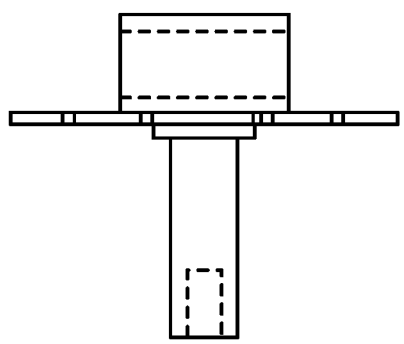
Figures 2, 6A:
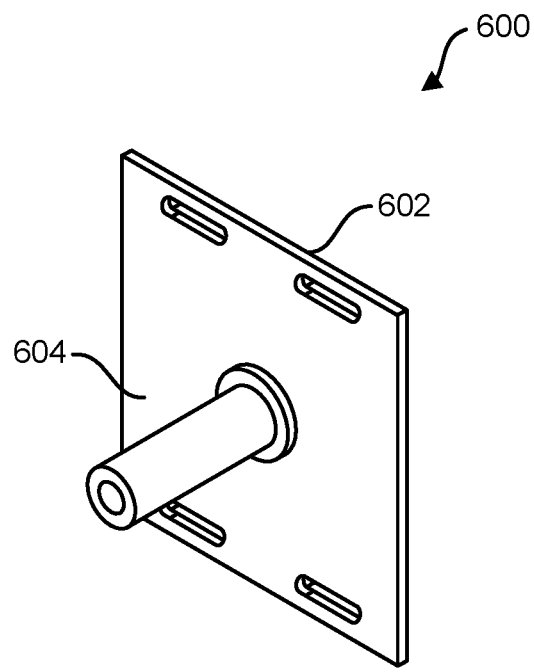
Figures 3, 6A:
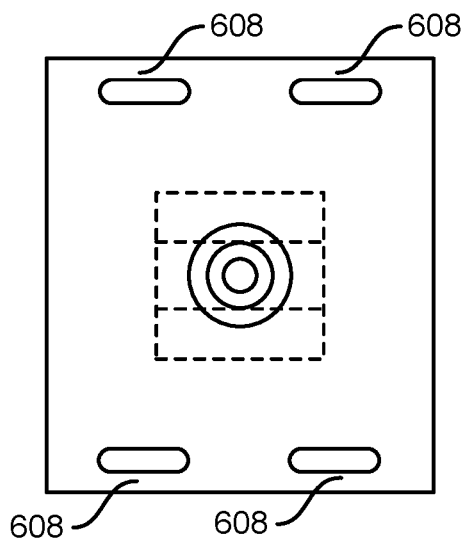
FIG. 6(A1) illustrates a top view of a wheel support plate of the remotely operated vehicle (ROV) in accordance with the present invention.
Figures 4, 6A:
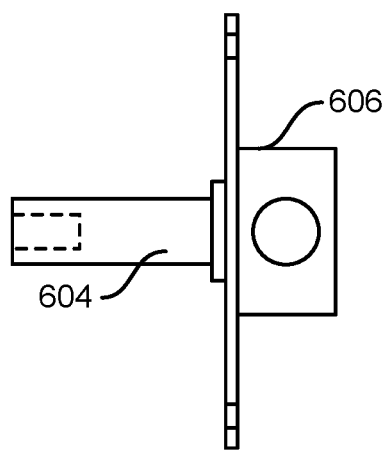
Figures 1, 6B:
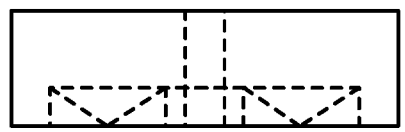
Figures 2, 6B:
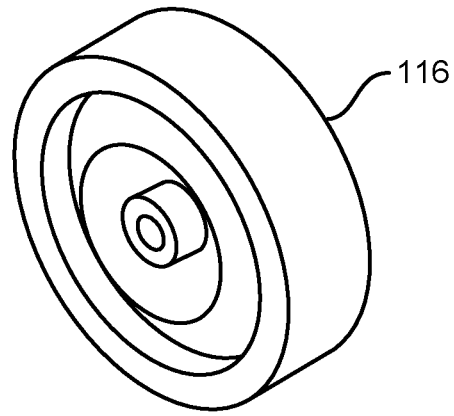
Figures 3, 6B:
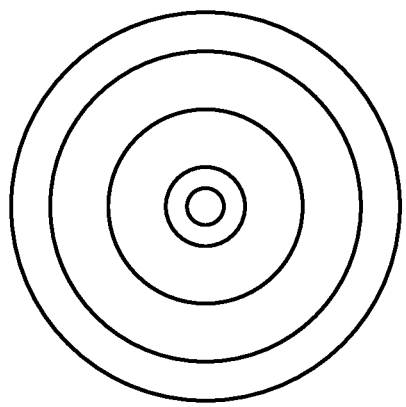
Figures 4, 6B:
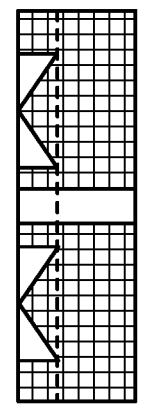

FIG. 5 (A) illustrates a wheel plate (140a, 140b) for accommodating wheels (116a, 116b, 116c, 116d). Each wheel plate (140a, 140b) further includes a pair of slots (502, 504) for accommodating wheels (116a, 116b, 116c, 116d). Each slot (502, 504) includes a single wheel (116a, 116b, 116c, 116d) that further used for moving the ROV (102) in respective positions where cleaning and inspection required.

FIG. 5 (B) illustrates a front view of the wheel plate (140a, 140b). The front view of the wheel plate (140a, 140b) shows a detailed view of shape of the slot. The shape of the slot (502, 504) may be rectangular, square and the like. More preferably, the shape of the slot (502, 504) is rectangular and curved at inner side. The slot (502) is cutout at a height 15 units from the lowest side of the wheel plate (140a, 140b). The distance between the two slots (502, 504) is 73 units. The length of the wheel plate (140a, 140b) is 593 units. The height of the wheel plate (140a, 140b) is 140 units. The slot (502, 504) is cut-out in middle of the wheel plate (140a, 140b) is 70 units.

FIG. 6(A1) detailed isometric view of a wheel support plate (600) that provide support to the wheel plate (140a, 140b) and the wheel (116a, 116b, 116c, 116d). The wheel support plate (600) is a rectangular plate (602) includes a front side, a backside and two parallel sides. The shape of the wheel plate support (600) is rectangle, square and the like. More preferably, the shape of the wheel support plate (600) is rectangle.

The wheel support plate (600) includes a shaft (604) at center that further accommodates the wheel (116) at center position. The distance at which the shaft (604) mounted from the front side of the wheel support plate (600) is in between 30 units to 45 units. More preferably, the distance at which the shaft (604) is mounted is 43.44 units. The backside of the rectangle plate (602) includes a rectangular portion (606) of the wheel support plate (600). More preferably, the length and the breath of the rectangular portion (606) on the backside of the wheel support plate (600) is 50 units and 30 units respectively. The wheel support plate (600) further includes multiple cut-outs (608) at extreme top and bottom of the wheel support plate (600).

Further, FIG. 6(A2) shows detailed top view of the wheel support plate (600). The top view of the details about the thickness of the wheel support plate (600). The length of the wheel support plate (600) is in between the 100 unit to 120 units. More preferably, the length of the rectangular plate (602) is 116.89 units. The length of the shaft (604) is in between 30 units-70 units. More preferably, the length of the shaft (604) is 60 units. The thickness of a mounting portion (610) at center of the wheel support plate (600) is 1 unit-5 units. More preferably, the thickness of the mounting portion (610) is 1 units. The thickness of the rectangular plate (602) is in between 1 units to 5 units. More preferably, the thickness of the wheel support plate (600) is 3 units.

Further, FIG. 6(A3) shows detailed front view of the wheel support plate (600). The front view of the wheel support plate (600) shows front side of the wheel support plate (600). More preferably, the wheel support plate (600) includes two cut-outs (608) at some distance from each opposite side of the plate (602). The distance from both side ranges from 15-20 units. More particularly, the distance is 19.25 units.

The distance between the two cut-outs (608) ranges between 25 units-50 units. More preferably, the distance between the two cut-outs (608) is 34 units. The distance from the top side of the wheel support plate (600) to the lower portion of the cut-out ranges from 10 units-15 units. More preferably, the distance from the top side of the wheel support plate (600) to the lower portion of the cut-out is 12.99 units. The breath of the wheel support plate (600) is in between the 100 units to 150 units. More preferably, the breath of the wheel support plate (600) is 130 units. The distance between the cut-out (608) from the top side and the bottom side of the wheel support plate (600) is between 100 units to 110 units. More preferably, the distance between the cut-out (608) from the top side and the bottom side of the wheel support plate is 104.45 units The diameter of inner portion of the shaft (604) ranges from 20-40 units. More preferably, the diameter of inner portion of the shaft (604) is 20 units. The diameter of the outer portion of the shaft (604) of the wheel support plate (600) ranges from 20-40 units. More preferably, the diameter of the outer portion of the shaft (604) of the wheel support plate (600) is 30 units.

Further, the side view of the wheel support plate (600) illustrated in FIG. 6(A4). A detailed view of the rectangular portion (606) on the back side of the plate (602) is shown. The rectangular portion (606) of the wheel support plate (600) includes a slot at a distance of 15 units longitudinally and at a distance of 25 units vertically within the rectangular portion (606).

FIG. 6(B1)) illustrates a detailed view of a wheel (116) mounted that allows the ROV (102) to move in multiple direction including forward direction, backward direction or any direction for inspecting and cleaning the surface. The isometric view of the wheel (116) show detailed view of the wheel (116). The wheel (116) is a concentric wheel. Further, the top view of FIG. 6(B) details about the thickness of the wheel (116) ranges from 50 units-70 units. More preferably, the thickness of the wheel (116) is 60 units.

Further, the FIG. 6(B2) illustrates detailed front view of the wheel (116). The wheel (116) includes an outer portion, a middle portion and an inner portion. The diameter of the outer portion of the wheel (116) ranges from 150 units to 250 units. More preferably, the diameter of the outer portion of the wheel (116) is 200 units. The diameter of the middle portion of the wheel (116) ranges from 150 units to 200 units. More preferably, the diameter of the middle portion of the wheel (116) is 160 units. The diameter of the inner portion of the wheel (116) ranges from 50 units to 120 units. More preferably, the diameter of the inner portion of the wheel (116) is 100 units.

Further, the inner portion of the wheel (116) includes two more concentric portion. The diameter of the two more concentric portion ranges from 10 units-50 units. More preferably, the diameter of the two more concentric portion is 40 units and 20 units respectively. The diameter of the outermost is 40 units and innermost is 20 units respectively.

Further, the sectional view E-E' of the wheel (116) illustrated in the FIG. 6(B4). Further, the sectional view of the wheel (116) details. The angle of the innermost portion of the wheel (116) with the outer portion of the wheel (116) ranges from the 30°-40°. More preferably, the angle of innermost portion of the wheel (116) with the outer portion of the wheel (116) is 34°.

Further, the wheel (116) includes a rubber wheel and a caste rim. In another embodiment, the rubber wheel of the wheel (116) made up of polyurethane. In another embodiment, the caste rim of the wheel (116) made up of steel. The rubber wheel of the wheel (116) mounted on the caste rim of the wheel.

Figure 7A:
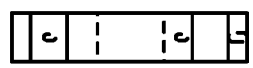
FIG. 7(A) illustrates a top view of the lifting eye of the remotely operated vehicle (ROV) in accordance with the present invention.

FIG. 7(A)-7(E) illustrates a lifting eye (142) connected to the motor (120) and the motor housing. The lifting eye (142) mounted on the base plate (138). The lifting eye (142) includes a top portion (702), a bottom portion (706) and a middle portion (704). As illustrated in FIG. 7(A), the top view of the lifting eye (142) shows breadth of the lifting eye (142) ranges from 90-150 units. More particularly, the breadth of the lifting eye (142) is 100 units. The length of curved portion of the lifting eye (142) is 30 units.

Figure 7B:
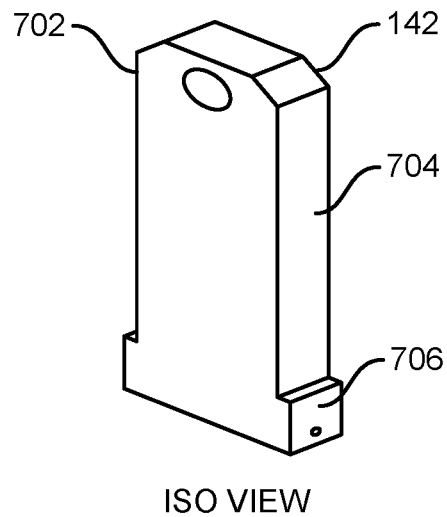
FIG. 7(B) illustrates a isometric view of the lifting eye of the remotely operated vehicle (ROV) in accordance with the present invention.
Figure 7C:
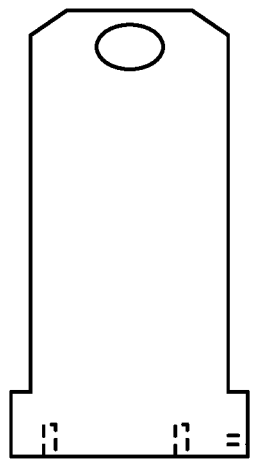
FIG. 7(C) illustrates a front view of the lifting eye of the remotely operated vehicle (ROV) in accordance with the present invention.
Figure 7D:
FIG. 7(D) illustrates a side view of the lifting eye of the remotely operated vehicle (ROV) in accordance with the present invention.
Figure 7E:
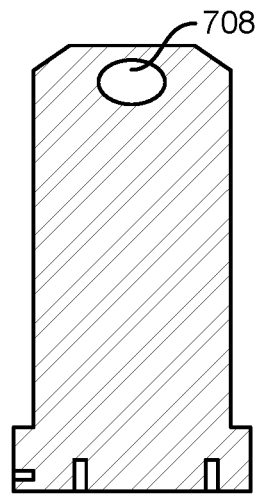
FIG. 7(E) illustrates a cross-sectional view of the lifting eye of the remotely operated vehicle (ROV) in accordance with the present invention.

As illustrated in FIG. 7(B), the FIG. focusses on an isometric view of the lifting eye (142), the top portion (702) is curved at adjacent sides. Further, the front view as illustrated in FIG. 7(C) of the lifting eye (142) shows detailed dimensional aspect of the lifting eye (142). The length of the top portion (702) of the lifting eye (142) ranges from 15-25 units. More preferably, the length of the top portion (702) of the lifting eye (142) is 22 units. The breath of the top portion (of the lifting eye (142) ranges from 45-55 units. More preferably, the breath of the top portion of the lifting eye (142) is 52.89 units.

Further, the length of the middle portion (704) of the lifting eye (142) ranges from 20-25 units. More preferably, the length of the middle portion (704) of the lifting eye (142) is 22 units. At initiation of the middle portion (704) of the lifting eye (142), the lifting eye (142) further includes a hole (708), having diameter 28 units. Further, the length of the bottom portion (706) of the lifting eye (142) ranges from 30-50 units. More preferably, the length of the bottom portion (706) of the lifting eye (142) is 40 units. More particularly, the distance between the top of the bottom portion and the bottom of the middle portion (704) is 8 units Further, the cross-sectional view illustrated in FIG. 7(E) of the lifting eye (142) shows a pair of slots at bottom of the bottom portion (706). The distance between the pair of slots at bottom is 56 units. The length of the slot is 20 units. The distance at which the slot is mounted is 25.5 units. The distance from the top portion (702) of the lifting eye (142) ranges from 20-25 units. More preferably, the distance from the top portion (702) of the lifting eye (142) to the hole (708) of the lifting eye (142) is 23 units. The distance from adjacent side to the center of the hole (708) ranges from 40-45 units. More preferably, the distance from adjacent side to the center of the hole (708) is 42 units.

Figures 1, 8A:
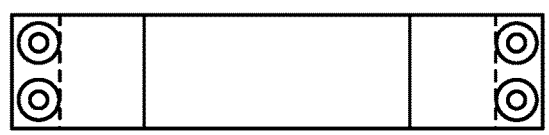
Figures 2, 8A:
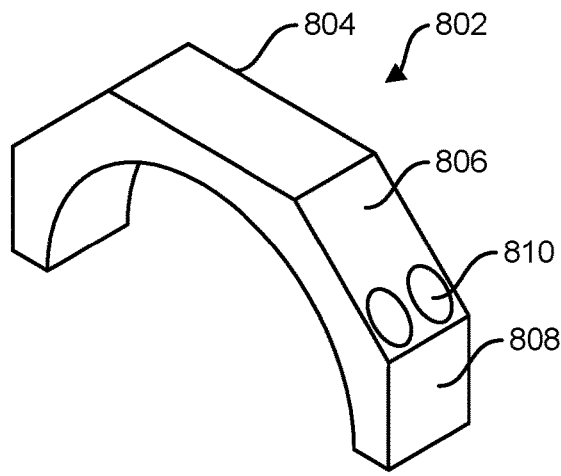
Figures 3, 8A:
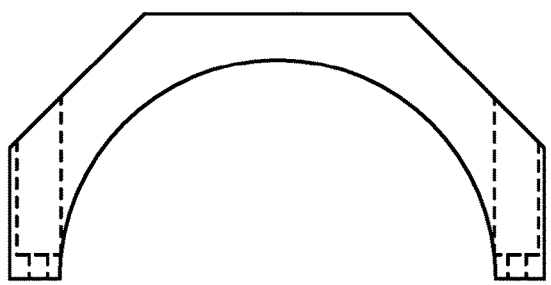
FIG. 8(A1) illustrates a top view of a top portion of a cam housing of the remotely operated vehicle (ROV) in accordance with the present invention.
Figures 4, 8A:
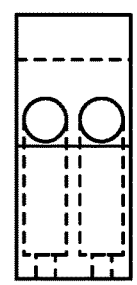

FIG. 8(A) illustrates a camera housing (800) for supporting the camera (112). The camera (112) is contained within the camera housing (800). FIG. 8(A) shows a detailed view of a top portion (802) of the camera housing (800). FIG. 8(A1) shows a detailed top view of the camera housing (800). The top view of the camera housing (800) shows the length of the top portion (802) is 140 units. Further, the top view also shows four slots at some distance from both opposite sides. The distance is 14 units. The slot configured for joining the cam housing (800) from both sides. The distance between the slots is 15 units.

Further, the isometric view shows detailed view of top portion (802) of the cam housing (800). The top portion (802) includes a first portion (804), two second portion (806) connected to opposite sides of the first portion (804), and two third portion (808) mounted below the two second portion (806). Further, the second portion (806) includes two consecutive holes (810). The second portion (806) is mounted at a certain angle with the first portion (804)

Further, the front view of the top portion (802) of cam housing (800). The length of the first portion (804) is 70 units. The length of the second portion (806) is 49.5 units. The length of the third portion (808) is 34.5 units. The length of the lower portion of the third portion (808) is 12.5 units. Further, in one embodiment, the cam housing (800) is circular in shape. The radius of the cam housing (800) is 57.5 units.

Further, the side view of the top portion (802) of the cam housing (800) focused on the radius of the slots. The radius of the slot is 7 units. Further, the slot mounted at 7 units distance from one end of the first side (804) of the top portion (802) of the cam housing (800).

Figures 1, 8B:
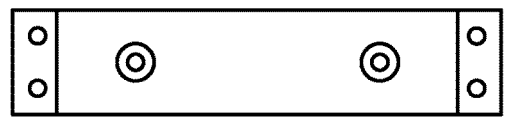
Figures 2, 8B:
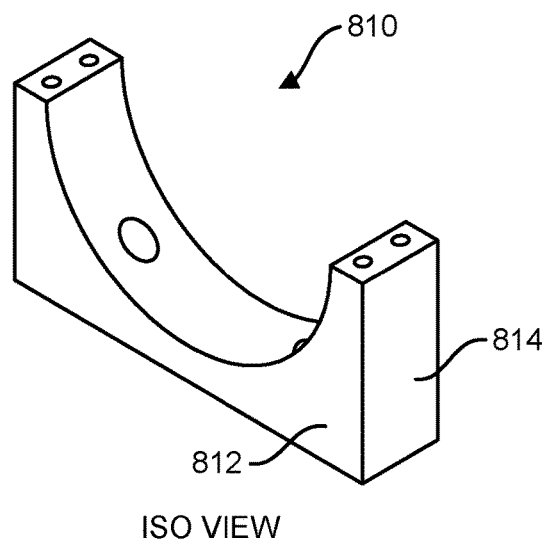
Figures 3, 8B:
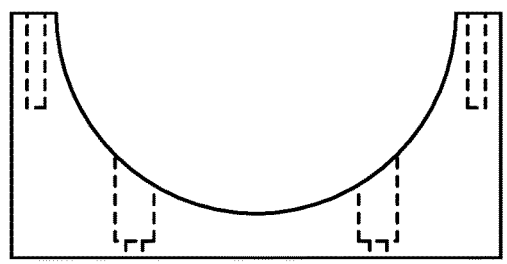
Figures 4, 8B:
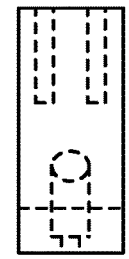

FIG. 8(B) illustrates a bottom portion (810) of the cam housing (800). Further, the bottom portion (810) includes a first portion (812) and two second portion (814) mounted upright to the first portion (812). The top side of the second portion (814) further includes slots on which the top portion (802) mounted to form the cam housing (800), which contains the camera (112) within it.

Further, the front view, as illustrated in FIG. 8(B3), focusses on the radius of the cam housing (800). The radius of the cam housing (800) is 57.5 units. The length of the first portion (812) is 140 units. Further, the side view, as illustrated in FIG. 8(B4) focusses on the thickness and height of the second portion (814). The thickness of the second portion (814) is 30 units. Further, the height of the second portion (814) is 70 units. Further, the top view of the bottom portion (810) of the cam housing (800) focusses on the slots by which it is connected with the top portion (802) of the cam housing (800). The distance between the slots is 15 units. Further, the two slots engraved in center of the second portion (814) focusses on the distance between them. The distance between the slots is 70 units.

FIG. 9(A) shows a detailed view of a top portion (902) an inspection vs motor top clamp (900). FIG. 9(A1) shows a detailed top view of the inspection vs motor top clamp (900). The top view of the inspection vs motor top clamp (900) shows the length of the top portion (902) is 191.97 units. Further, the top view also shows four slots at some distance from both opposite sides. The distance is 15 units. The slot configured for joining the inspection vs motor top clamp (900) from both sides. The distance between the slots is 15 units.

Further, the isometric view shows detailed view of top portion (902) of the inspection vs motor top clamp (900). The top portion (902) includes a first portion (904), two second portion (906) connected to opposite sides of the first portion (904), and two third portion (908) mounted below the two second portion (906). Further, the second portion (906) includes two consecutive holes (910). The second portion (906) is mounted at a certain angle with the first portion (904)

Further, the front view of the top portion (902) of the inspection vs motor top clamp (900). The length of the first portion (904) is 91.97 units. The length of the second portion (906) is 70.7 units. The length of the third portion (908) is 51.6 units. Further, in one embodiment, the INSPECTION vs motor top clamp (900) is circular in shape. The radius of the inspection vs motor top clamp (900) is 84 units.

Figures 1, 9B:
Figures 2, 9B:
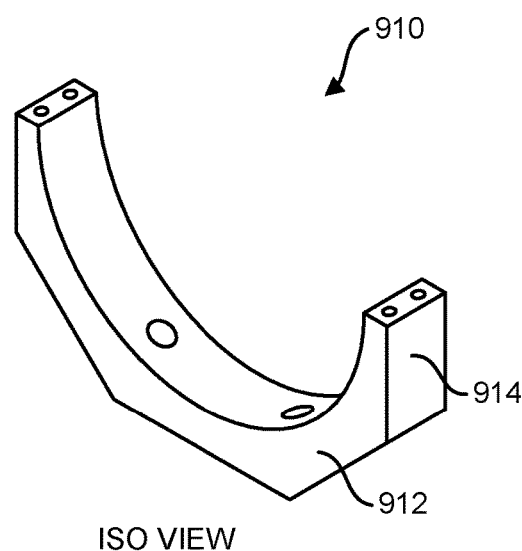
Figures 3, 9B:
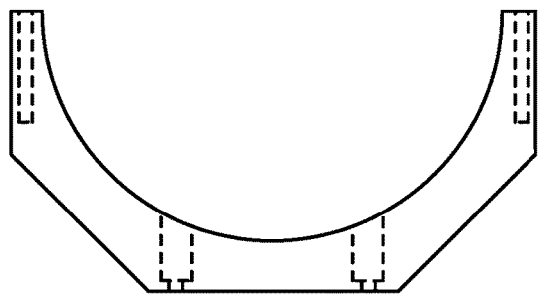
FIG. 9(A1) illustrates a top view of a top portion of the inspection module VS Motor top clamp of the remotely operated vehicle (ROV) in accordance with the present invention.
Figures 4, 9B:
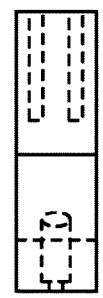

FIG. 9(B) illustrates a bottom portion (910) of the inspection vs motor top clamp (900). Further, the bottom portion (910) includes a first portion (912) and two second portion (914) mounted upright to the first portion (912) and a third portion (916) connected to the second portion (914). The top side of the second portion (914) further includes slots on which the top portion (902) mounted to form the inspection vs motor top clamp (900), which contains the motor within it. The length of the first portion (912) is 91 units, the length of the second portion is 70.7 units and the third portion is 525 units.

Further, the front view, as illustrated in FIG. 9 (B3), focusses on the radius of the inspection vs motor top clamp (900). The radius of the inspection vs motor top clamp (900) is 84 units. The length of the first portion (912) is 191 units. Further, the side view, as illustrated in FIG. 9 (B4) focusses on the thickness and height of the second portion (914). The thickness of the second portion (914) is 30 units. Further, the height of the second portion (894) is 102.4 units. Further, the top view of the bottom portion (910) of the inspection vs motor top clamp (900) focusses on the slots by which it is connected with the top portion (902) of the INSPECTION vs motor top clamp (900). The distance between the slots is 15 units. Further, the two slots engraved in center of the second portion (914) focusses on the distance between them. The distance between the slots is 70 units.

Figures 1, 10A:
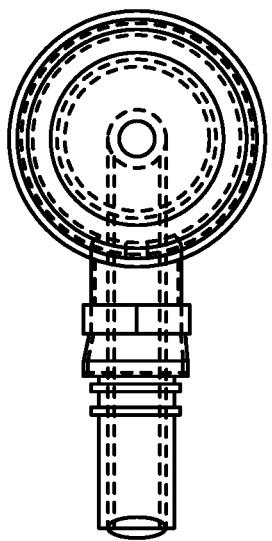
Figures 2, 10A:
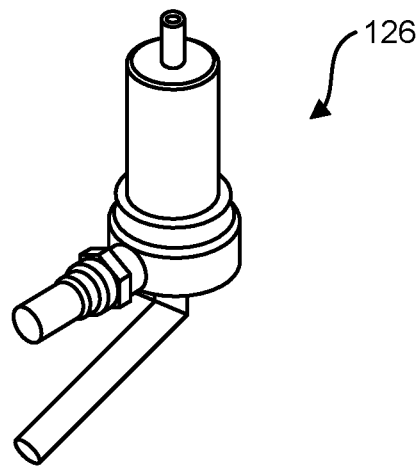
Figures 3, 10A:
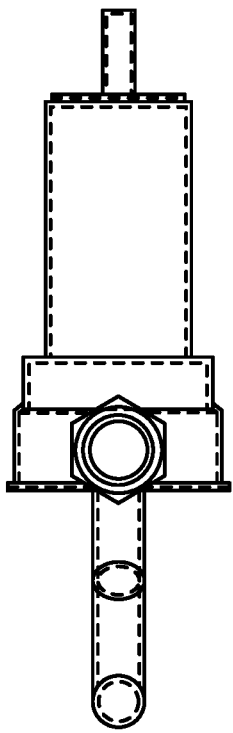
FIG. 10(A1) illustrates a top view of a conversion nozzle of a nozzle assembly of the remotely operated vehicle (ROV) in accordance with the present invention.
Figures 4, 10A:
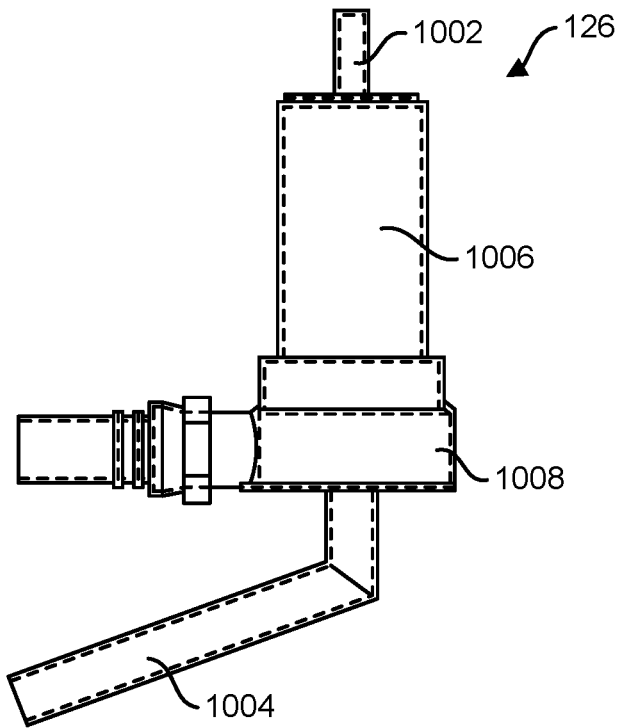

FIG. 10(A) illustrates a conversion nozzle (126) of the nozzle assembly (124) for performing the cleaning action to clean the surface. The nozzle assembly (124) mechanically coupled with the suction hose (122) and the cleaning pump (120) to provide the cleaning action for cleaning the surface. The cleaning action is removal of dust, removal of residue and removal of liquid from the surfaces. The nozzle assembly (124) is fixed on the base plate (138) using the multiple bolts and screws. The nozzle assembly (124) includes a conversion nozzle (126), a nozzle end (128), and a nozzle clamp (130).

Further, as illustrated in FIG. 10(A), focusses on the conversion nozzle (126) of the nozzle assembly (124). The conversion nozzle (126) enables the nozzle end (128) to draw the residue from the surface and the path along the surface. The conversion nozzle (126) includes multiple modules to suck the dirt through the nozzle end to remove residue and dirt from the surface. The weight of the conversion nozzle (126) is 5.224 kg. Further, the FIG. 10(A)

focusses on isometric, top, front and side view of the conversion nozzle (126) of the nozzle assembly (124).

The conversion nozzle (126) includes two suction pipe (1002, 1004), a collector (1006) and an evacuator (1008). Further, the two suction pipe (1002, 1004) withdraws dirt and residue from the surface and the corners. Further, the dust collected in the collector (1006) and further, the dust collected is evacuated through the evacuator (1008).

Figures 1, 10B:
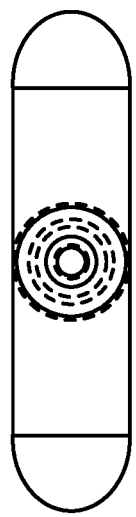
Figures 2, 10B:
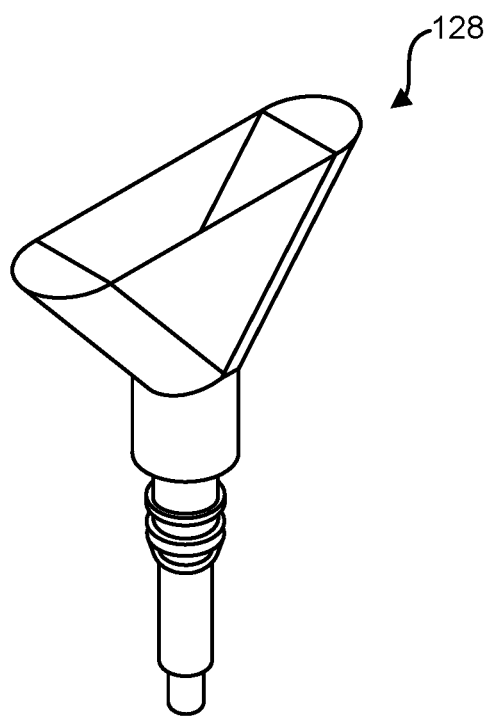
Figures 3, 10B:
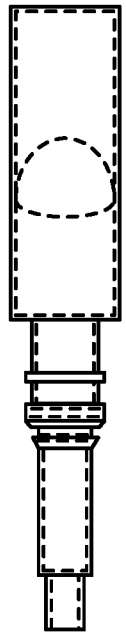
Figures 4, 10B:
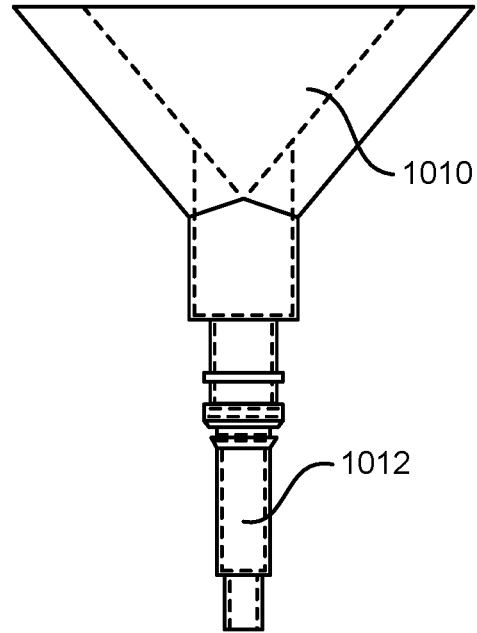

Further, the FIG. 10(B) focusses on the isometric view of the nozzle end (130) draws residues from the surface and the path along the surface. The nozzle end (110) includes a front end (1010), a suction pipe (1012) connected to the front end (1010). The front end (1010) connected to a lower portion of the ROV (102). The suction pipe (1012) connected to the base plate (138) of the ROV (102). Further, the top view focusses on the conical shape of the front end (1010) of the nozzle end (130). Further two views that the front view and the side view of the nozzle end (130) focusses on detailing of the nozzle end (130).

Figures 1, 10C:
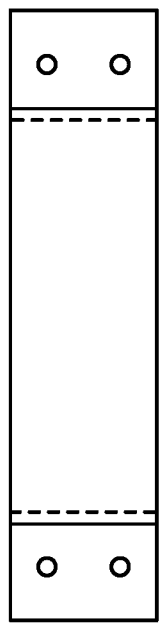
Figures 2, 10C:
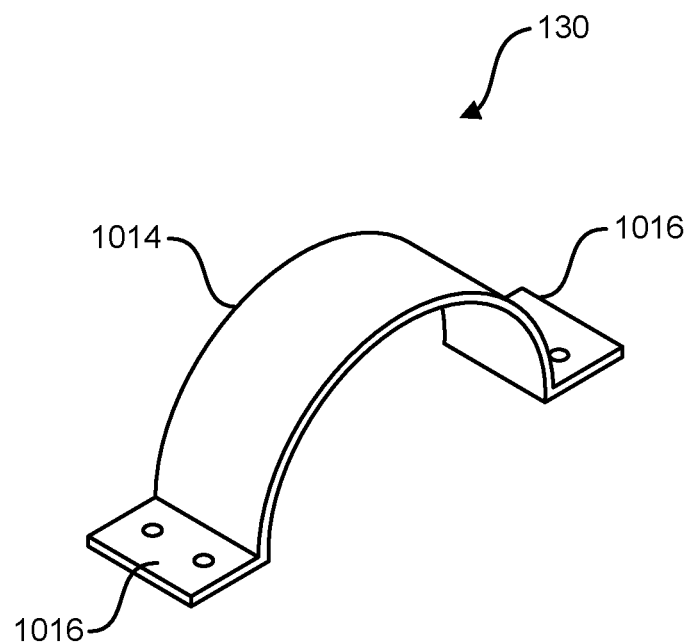
Figures 3, 10C:
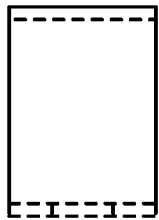
Figures 4, 10C:
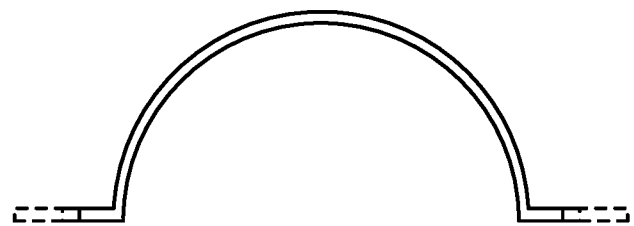

FIG. 10(C) illustrates a nozzle clamp (130) connected to the nozzle end (128). The nozzle clamp (130) includes a first portion (1014) that fitted to the suction pipe of the nozzle end (128). The clamp (130) further includes a second portion (1016) fitted opposite sides of the first portion (1014) of the nozzle end (1004). The weight of the nozzle clamp (130) is 0.213 units.

Further, the front view focusses on the length of the first portion (1014). The length of the first portion (1014) is 40 units. Further, the side view focusses on the radius of the first portion (1014) of the nozzle clamp (130). The radius of the first portion (1014) ranges from 54-57 units. The length of the second portion (1016) is 30 units. Further, the top view focusses on the slots mounted on the second portion (1016) for fixing the nozzle clamp (130) to the nozzle end (128). The distance between the slots is 20 units. The slot mounted at a distance of 15 units. The breath of the second portion is 40 units.

Figures 1, 10D:
Figures 2, 10D:
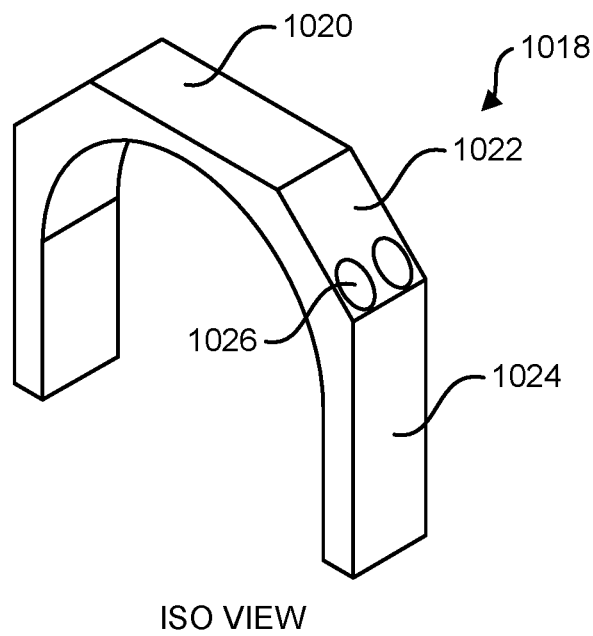
Figures 3, 10D:
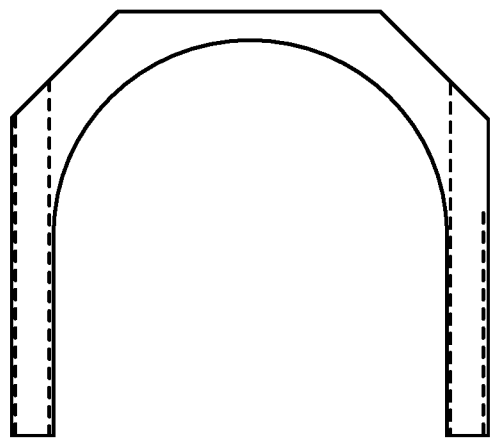
Figures 4, 10D:
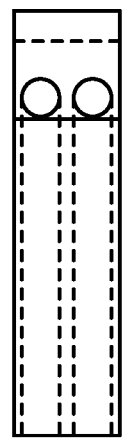
Figure 11A:
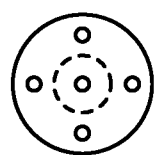
FIG. 11(A) illustrates a top view of a sonar stand of the remotely operated vehicle (ROV) in accordance with the present invention.
Figure 11B:
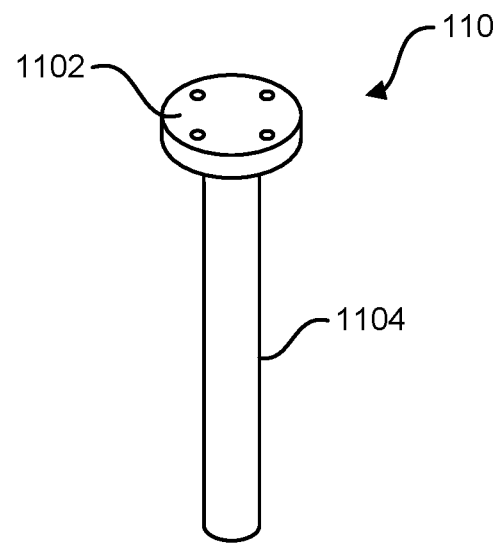
FIG. 11(B) illustrates a isometric view of the sonar stand of the remotely operated vehicle (ROV) in accordance with the present invention.
Figure 11C:
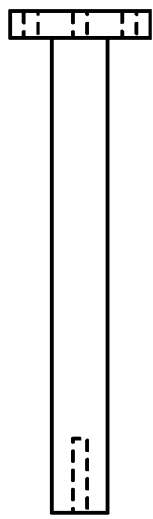
FIG. 11(C) illustrates a front view of the sonar stand of the remotely operated vehicle (ROV) in accordance with the present invention.
Figure 11D:
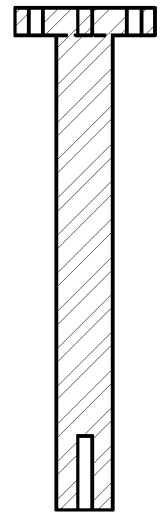
FIG. 11(D) illustrates a side view of the sonar stand of the remotely operated vehicle (ROV) in accordance with the present invention.
Figures 1, 12B:
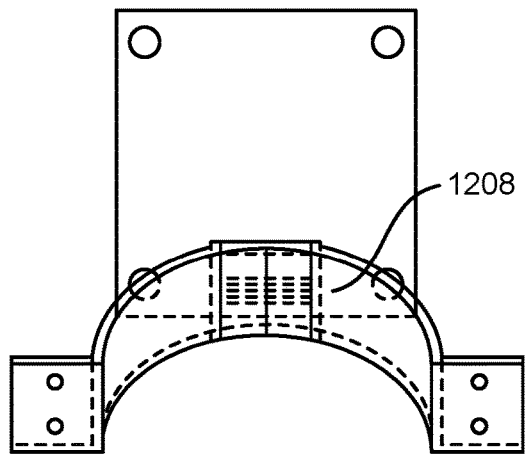
Figures 2, 12B:
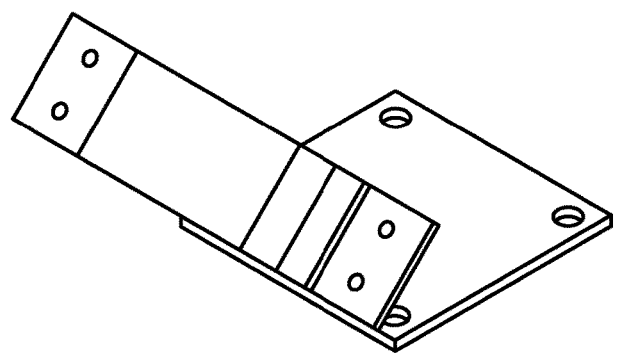
Figures 3, 12B:
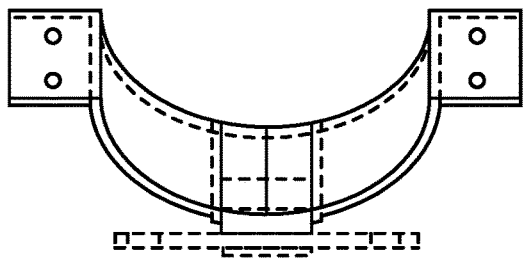
FIG. 12(A1) illustrates a top view of a vac-holder of the remotely operated vehicle (ROV) in accordance with the present invention.
Figures 4, 12B:
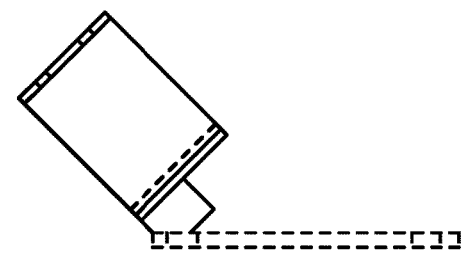
Figures 1, 13A:
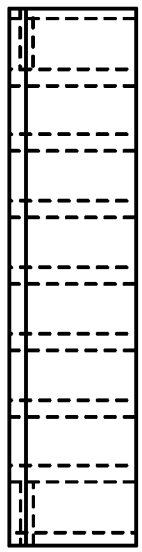
Figures 2, 13A:
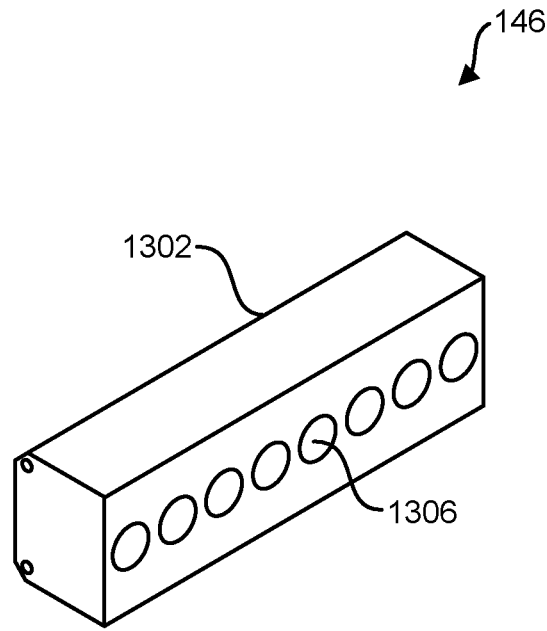
Figures 3, 13A:
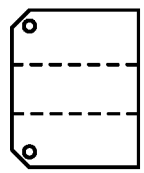
FIG. 13(A1) illustrates a top view of a top plate of a transducer block of the remotely operated vehicle (ROV) in accordance with the present invention.
Figures 4, 13A:
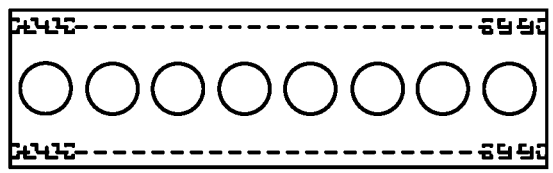

Further, as illustrated in FIG. 10(D), the FIG. focusses on the back pump clamp (1018) of the nozzle assembly (124). The front nozzle clamp (1018) includes a first portion (1020), two-second portion (1022) connected to opposite sides of the first portion (1020), and two third portion (1024) mounted below the two-second portion (1022). Further, the second portion (1022) includes two consecutive holes (1026). The second portion (1022) is mounted at a certain angle with the first portion (1020)

Further, the front view of the back pump clamp (1018) of the nozzle assembly (124). The length of the first portion (1020) is 75 units. The length of the second portion (1022) is 43.8 units. The length of the third portion (1024) is 91.8 units. Further, in one embodiment, the back pump clamp (1018) is circular in shape. The radius of the back pump clamp (1018) is 56.5 units.

The top view of the back pump clamp (1018) shows the length of the first portion (1020) is 191.97 units. Further, the top view also shows four slots at some distance from both opposite sides. The distance is 15 units. The slot configured for joining the back pump clamp (1018) from both sides. The distance between the slots is 15 units.

FIG. 11 illustrates a sonar erector (110) which scans obstacles in the path along the surface. The sonar (110) is fixed on the base plate (138) of the remotely operated vehicle (ROV) (102). In general, sonar is a technique that uses sound propagation to navigate, measure distances, communicate with or detect objects on or under the surface of the water, such as other vessels. In an example, the obstacles may be less frictional surface, obstruction in the path by solid substances, walls, grease in the path along the surface and the like.

As illustrated in FIG. 11, the isometric view focused on the sonar erector (110). The sonar erector (110) includes a sonar head (1102) detects the obstacles in the path along the surface. In general, sonar is a technique that uses sound propagation to navigate, communicate with or detect objects on or under the surface of the water, such as other vessels.

In addition, the sonar head (1102) of the sonar erector (110) associated with the remotely operated vehicle (ROV) (102) prevents ROV (102) to get damage. In another embodiment, the sonar head (1102) associated with the (ROV) (102) prevents the associated with the remotely operated vehicle (ROV) (102) to be destroyed. In yet another embodiment, the sonar head (1102) associated with the remotely operated vehicle (ROV) (102) prevents the associated with the remotely operated vehicle (ROV) (102) to collide with any substance that may harm the remotely operated vehicle (ROV) (102).

The exploded view of the sonar erector (110) includes the flex shaft (1104) positioned at below end of the sonar head (1102). Further, the sonar head (1102) is circular in shape and the sonar head (1102) includes slots. As illustrated in FIG. 11, the front view focused on the sonar erector (110). The length of the connecting pipe (1104) is 170 units. Further, the cross-sectional view of the sonar erector (110) shows detailed view of D-D', the length of the slot inside the connecting pipe (1104) is 27 units. The diameter of the connecting pipe (1104) is 20 units.

FIG. 12(A1)-12(A4) illustrates a vac-holder (144) mounted below the base plate (138) and further attached with the nozzle end. The vac-holder configured for holding supporting nozzle assembly (124) and further can be used for accommodating vacuum cleaner for proper and efficient cleaning. If the remotely operated vehicles (ROV) (102) is being lowered with the nozzle pointed downward, the vac-holder (144) will reorient the robot to the horizontal direction as it comes in contact with the surface. The vac-holder (144) includes a curved portion (1202) and a shaft (1206) connected to the curved portion. Further, the shaft (1206) includes multiple slots at lower end for connecting them to the bottom of the base plate (138).

Further, side view focusses on the dimensions of the shaft (1204) and the curved portion (1202). The length of the shaft (1204) is 380 units and the radius of the curved portion (1202) is 51.34 units.

FIG. 12(B1)-12(B4) illustrates a vac-bottom clamp (1200) to connect the vac-holder (142) further attached with the nozzle end. The vac-bottom clamp (1200) includes a first portion (1202) and a two-second portion (1204) connected on opposite sides of the first portion (1202) for connecting the vac-holder (142) with the ROV (102). Further, the vac-bottom clamp (1200) includes a rectangular plate (1206) connected on top of the first portion (1202) of the vac-bottom clamp (1200). Further, the rectangular plate (1206) includes two slots on top side and bottom sides respectively connected to the vac-holder (142) and the ROV (102).

As illustrated in top view in FIG. 12(B1) focusses on top view of the vac-bottom clamp (1200). Further, the length and breadth of the rectangular plate (1206) of the vac-bottom clamp (1200) is 100 units and 100 units respectively. The distance between the slots is 80 units. Further as illustrated, in front view of the vac-bottom clamp (1200), the radius of the first portion (1202) is 71.99 units. Further, the length of the vac-bottom clamp (1200) is 28.28 units.

Further, the rectangular plate (1206) mounted at an angle 45° with the first portion (1202).

FIG. 13(A1) illustrates a top view of a top plate (1302) of a transducer block (146) of the remotely operated vehicle (ROV) (102). The transducer block (146) includes a top plate (1302) and a pair of side plate (1304) connected on side ends of the top plate (1302). The top view focusses on the shape of the top plate. The shape of the top plate (1302) is rectangular. The length of the top plate (1302) is 170 units and width of the top plate (1302) is 40 units.

FIG. 13(A2) illustrates an isometric view of the top plate (1302) of the transducer block (146) of the remotely operated vehicle (ROV) (102). The transducer block (146) carries the transducer (108). The isometric view shows the front side of the top plate (1302) includes multiple holes (1306), which holds the transducer (108) scans the obstacles along the surface.

FIG. 13(A3) illustrates a front view of the top plate (1302) of a transducer block (146) of the remotely operated vehicle (ROV) (102). The from view focusses on the shape of the side end of the top plate (1302). The side end of the top plate (1302) curved at top of the side end. The length of the side end is 40 units. The curved portion of the side end of the top plate (1302) further includes a pair of holes on top and bottom end of the plate.

FIG. 13(A4) illustrates a side view of the top plate (1302) of the transducer block (146) of the remotely operated vehicle (ROV) (102). The front side of the top plate (1302) of the transducer block (146) further includes multiples holes (1306), which includes transducers. Each single hole (1306) holds a single transducer (108). The holes (1306) are mounted at equidistant to each other. The diameter of the holes (1306) is 16 units.

FIG. 13(B1) illustrates a top view of a side plate (1304) of a transducer block (146) of the remotely operated vehicle (ROV) (102). The top view of the side plate (1304) focusses on the width of the side plate (1304). The width of the side plate (1304) is 10 units FIG. 13(B2) illustrates an isometric view of the side plate (1304) of the transducer block (146) of the remotely operated vehicle (ROV) (102). The side plate (1304) includes a top side (1308), a middle portion (1310) and a bottom side (1312). The middle portion (1310) includes consecutive three holes (1312).

FIG. 13(B3) illustrates a front view of the side plate (1304) of the transducer block (146) of the remotely operated vehicle (ROV) (102). The middle portion (1310) includes consecutive three holes (1312). Each hole (1312) has a diameter 22 units. The length of the side plate (1304) is 40 units. The top side (1308) is curved at ends. The top side curved at distance of 5 units from the ends.

FIG. 13(B4) illustrates a side view of the side plate (1304) of the transducer block (146) of the remotely operated vehicle (ROV) (102). The length of the side plate (1304) of the transducer block (146) is 130 units. Further, the side view also focusses on the sectional view B-B' of the side plate (1304). The side plate (1304) includes three consecutive slots at a distance of 11.5 units, 22.5 units and 33.5 units respectively.

Figure 14A:
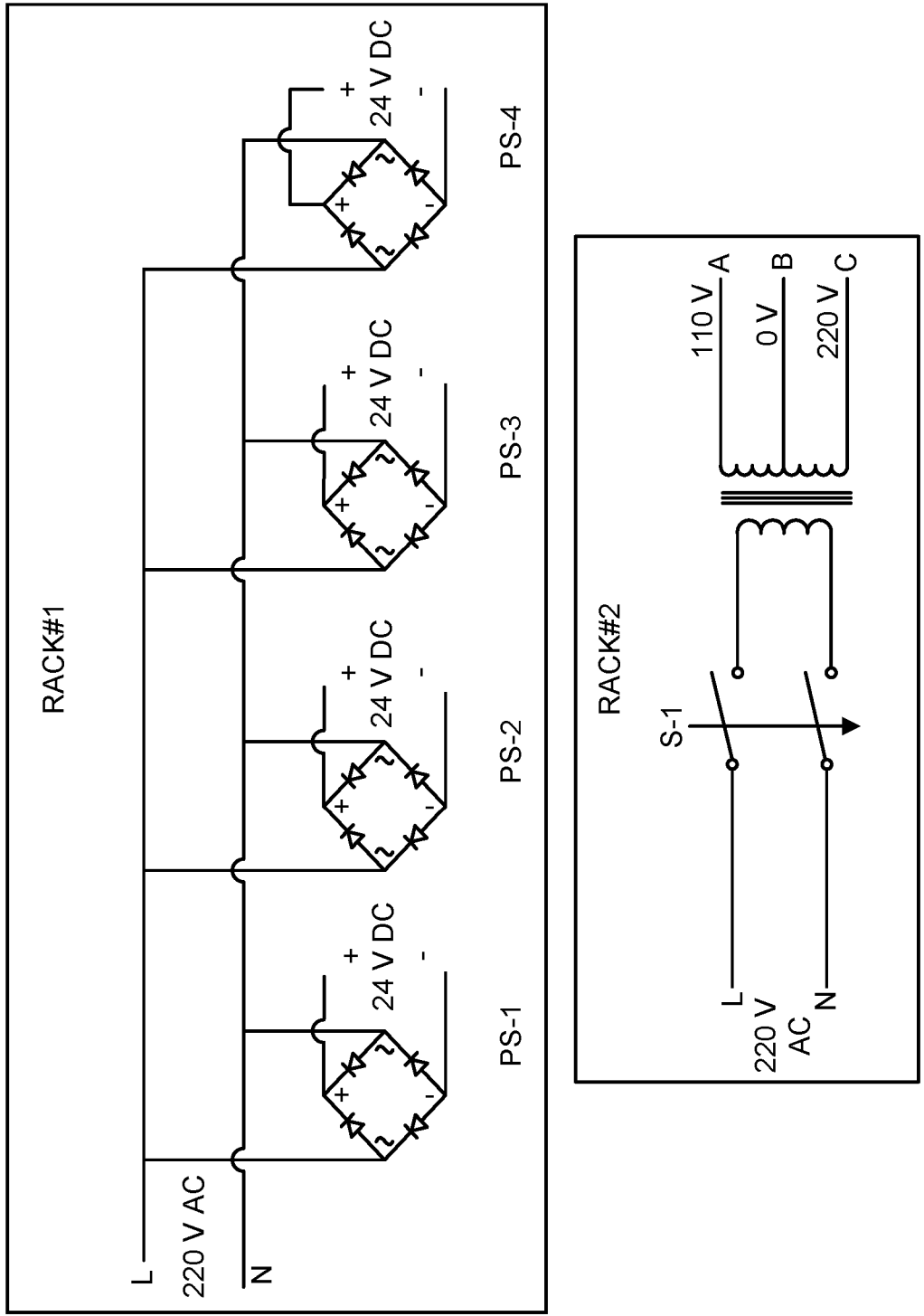
FIG. 14(A) illustrates a RACK #1 and RACK #2 in the master control unit for controlling the remotely operated vehicle (ROV) in accordance with the present invention.

FIG. 14(A)-FIG. 14(G) illustrates an electrical circuit arrangement of the master control unit (132) for controlling the remotely operated vehicle (ROV). FIG. 14(A) illustrates a RACK #1 and RACK #2 showing detailed view of electronic circuits. The power supply provided to the ROV (102) 220V AC supply. Further RACK #2 illustrates a switches arrangement connected with a step-up transformer.

Figure 14B:
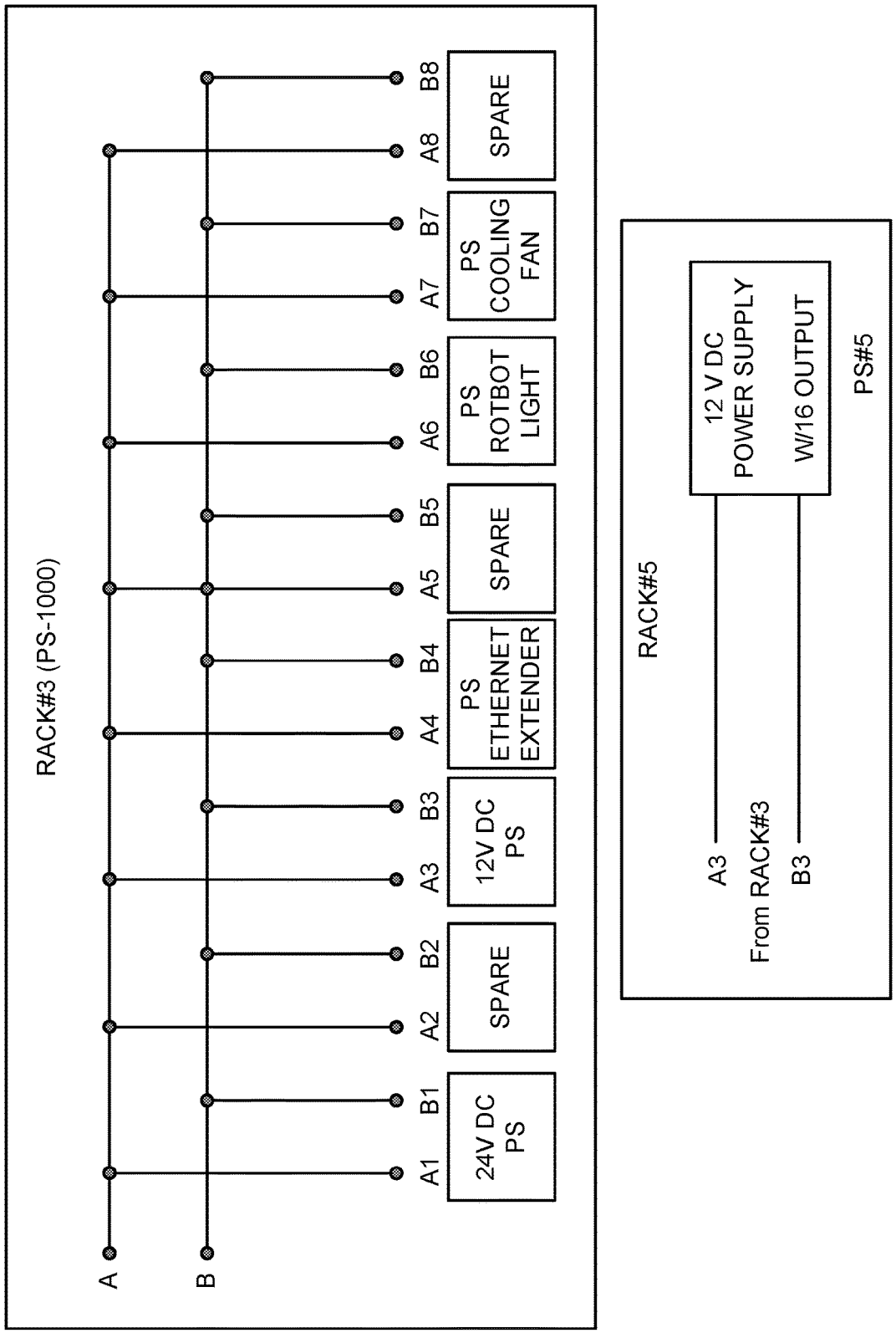
FIG. 14(B) illustrates a RACK #3 and RACK #5 in master control unit for controlling the remotely operated vehicle (ROV) in accordance with the present invention.

FIG. 14(B) illustrates a RACK #3 and RACK #5 in master control unit (132) for controlling the remotely operated vehicle (ROV). The RACK #3 focusses on the PS1000 Pressure Switch for measuring pressure across switches. The main line A includes A1-A8 switches. Further, the main line B includes B1-B8 switches. The A1-A8 connected to 24 DC power supply, A2B2 connected to spare, A3B3 connected to 12V DC power supply A4B4 connected to power supply Ethernet extender, A5B5 connected to spare, A6B6 connected to PS ROTBOT LIGHT, A7B7 connected to PS cooling fan, A8B8 connected to the spare. Further RACK #5 focusses on the A3B3 with 12 V DC power supply W/16 output.

Figure 14C:
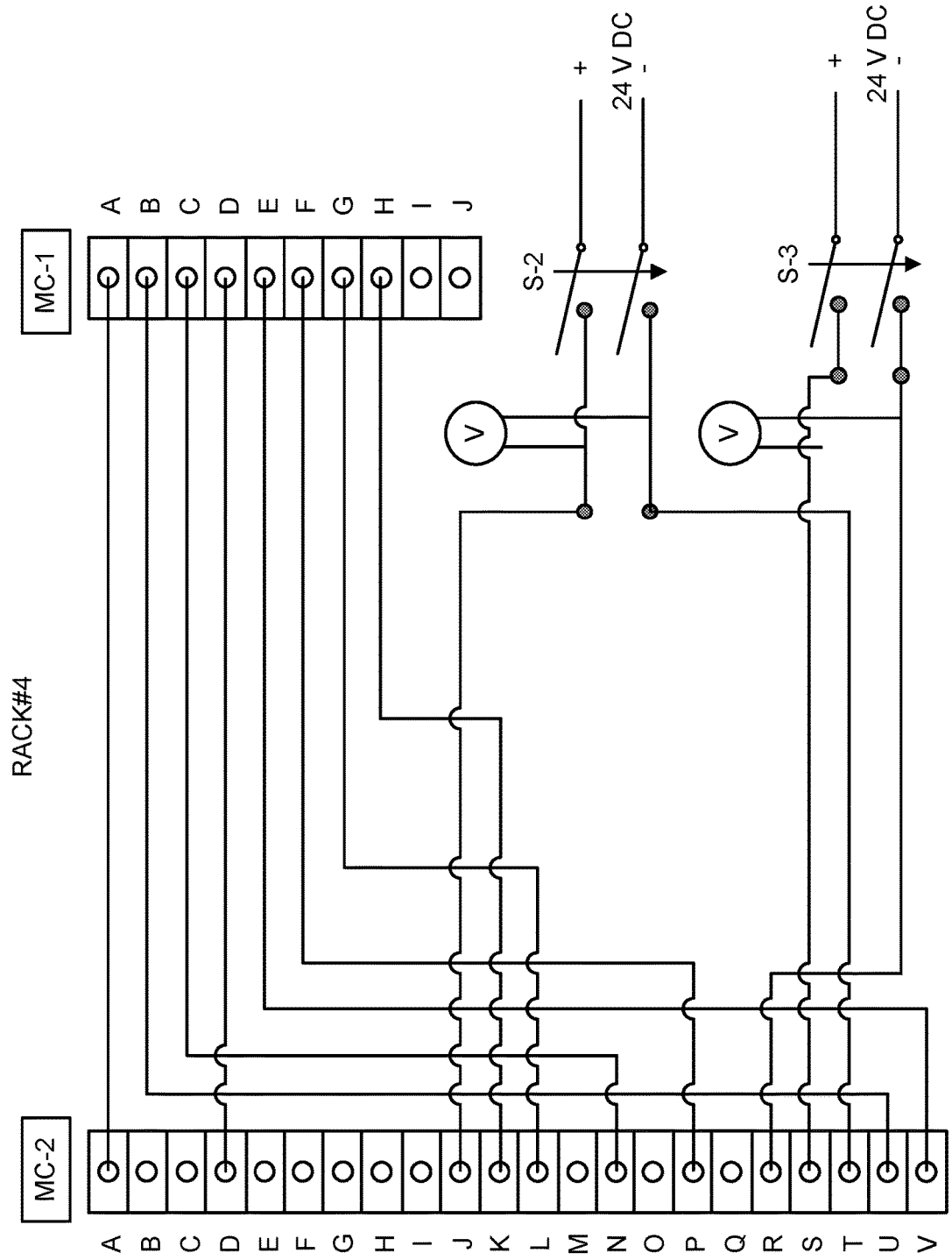
FIG. 14(C) illustrates a RACK #4 in master control unit for controlling the remotely operated vehicle (ROV) in accordance with the present invention.

FIG. 14(C) illustrates a RACK-#4 in master control unit for controlling the remotely operated vehicle (ROV). The MC-2 includes main controller A TO V that is further connected with the main controller (MC-1), which includes A-J controller connected with corresponding MC-2 controller components. Further, it includes two switches S2 and S3 connected with 24V DC supply.

Figure 14D:
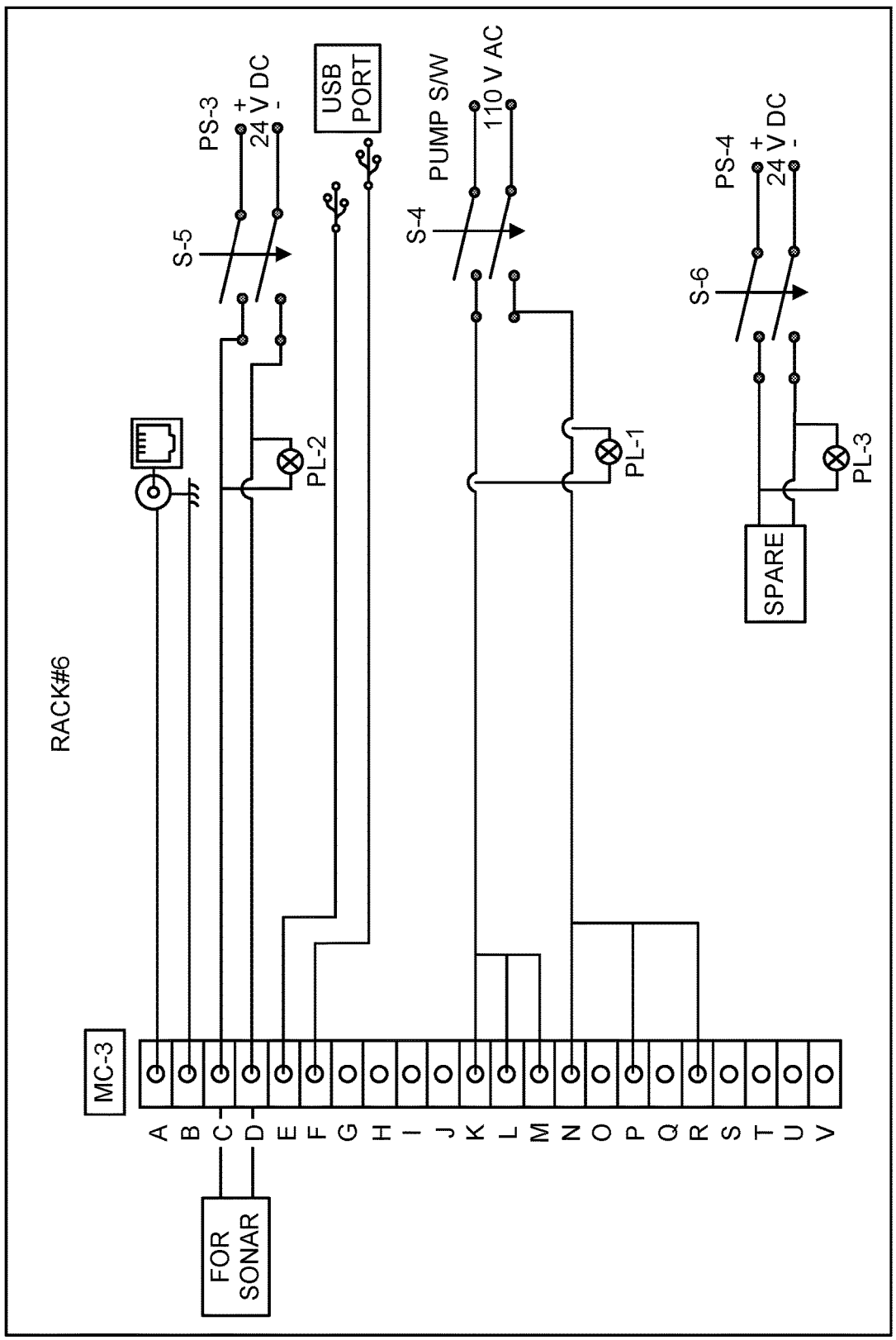
FIG. 14(D) illustrates a RACK #6 in master control unit for controlling the remotely operated vehicle (ROV) in accordance with the present invention.

FIG. 14(D) illustrates a RACK #6 in master control unit for controlling the remotely operated vehicle (ROV). The RACK #6 includes a main controller (MC-3) further including A-V for Sonar (112) of the navigation unit (106). Further, the RACK #6 includes switches (S-4, S-5 and S-6). The switch (S-4) connected with the pump, switch (S-5) connected with the 24 V DC supply, and further the switch (S-6) connected with the 24V DC Supply and spare on other side.

Figure 14E:
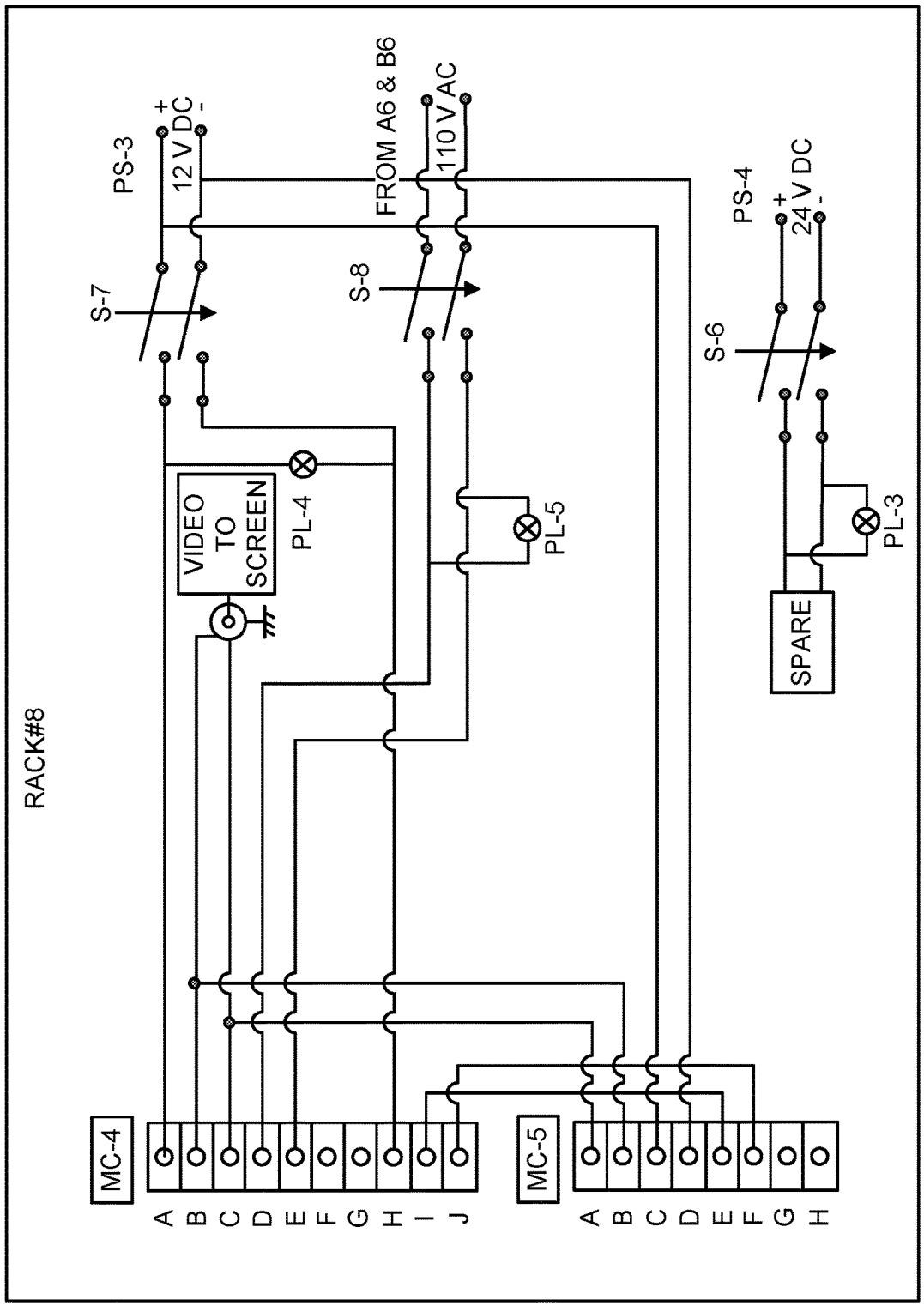
FIG. 14(E) illustrates one of the two sections of RACK #8 in master control unit for controlling the remotely operated vehicle (ROV) in accordance with the present invention.

FIG. 14(E) illustrates a RACK #8 in master control unit for controlling the remotely operated vehicle (ROV). The RACK #8 includes a main controller (MC-4) includes A-J further connected with the switches S-8 and S-7. The S-7 switch connected with PS-3 and a 12V DC supply. Further, the RACK #8 includes MC-5 that further includes A-H and further includes Switch (S-6) connected with 24V DC supply. Further MC-4 connected to the video to screen.

Figure 14F:
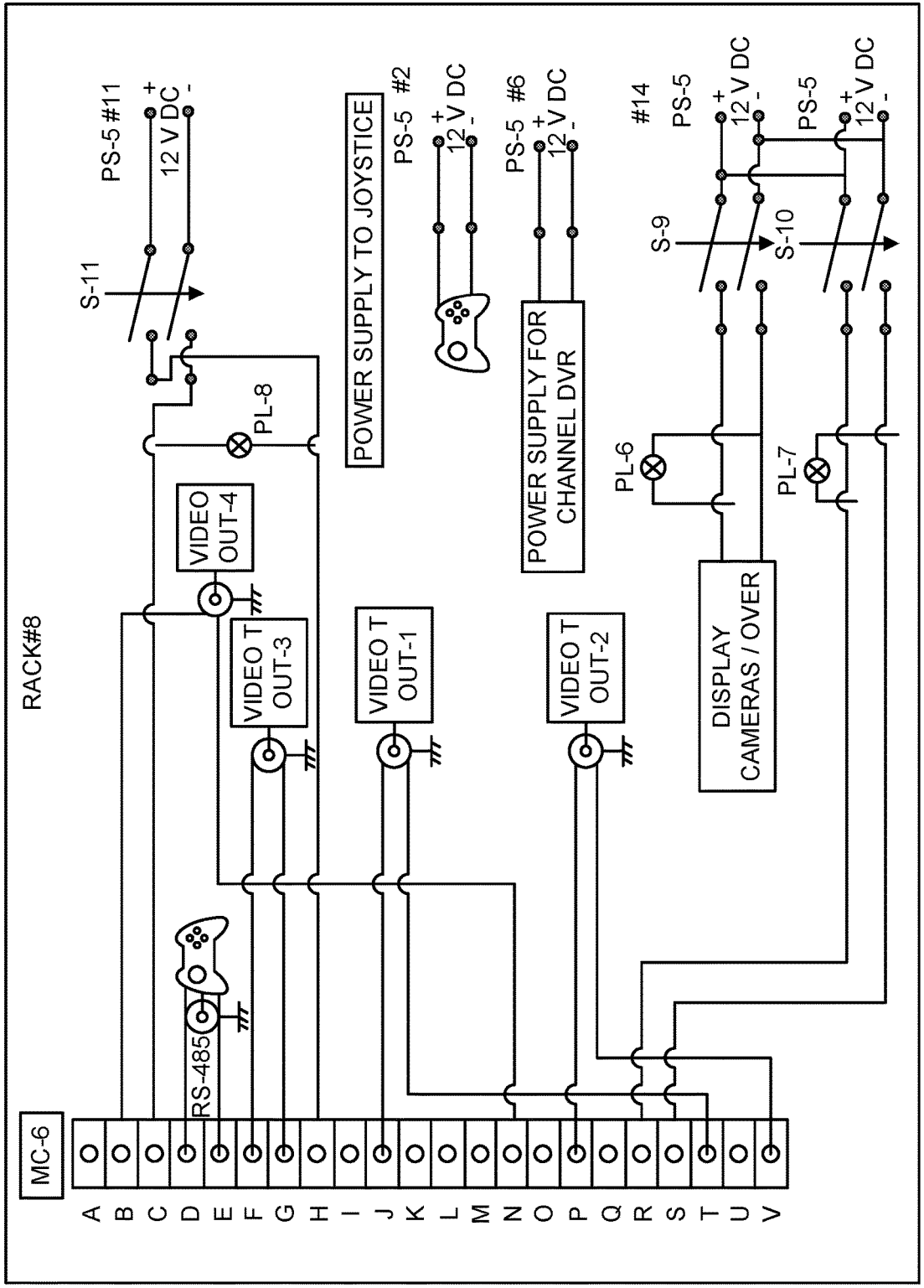
FIG. 14(F) illustrates the second section of RACK #8 in master control unit for controlling the remotely operated vehicle (ROV) in accordance with the present invention.
Figure 14G:
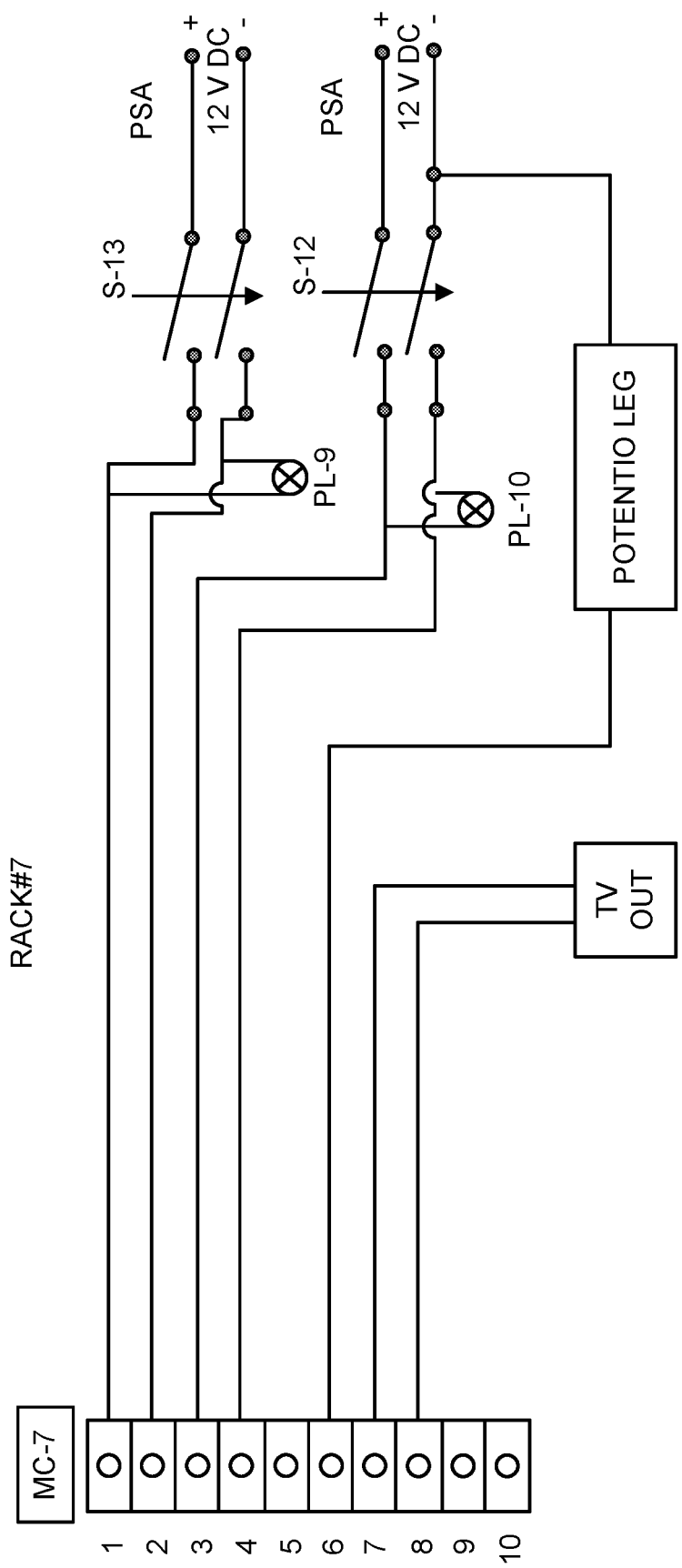
FIG. 14(G) illustrates a RACK #7 in master control unit for controlling the remotely operated vehicle (ROV) in accordance with the present invention.

FIG. 14(F) illustrates a RACK #8 in master control unit for controlling the remotely operated vehicle (ROV). The RACK #8 includes a main controller (MC-6) includes A-V further connected with the switches S-9, S-11 and S-10. The S-9 and S-10 switch connected with PS-5 and a 12V DC supply. Further, the RACK #8 further includes Switch (S-11) connected with 24V DC supply. Further MC-4 connected to the video to screen, display cameras FIG. 14(G) illustrates a RACK #7 in master control unit for controlling the remotely operated vehicle (ROV). Further, the RACK #7 includes 1-10 further connected with the switches S-12 and S-13.

Figure 15:
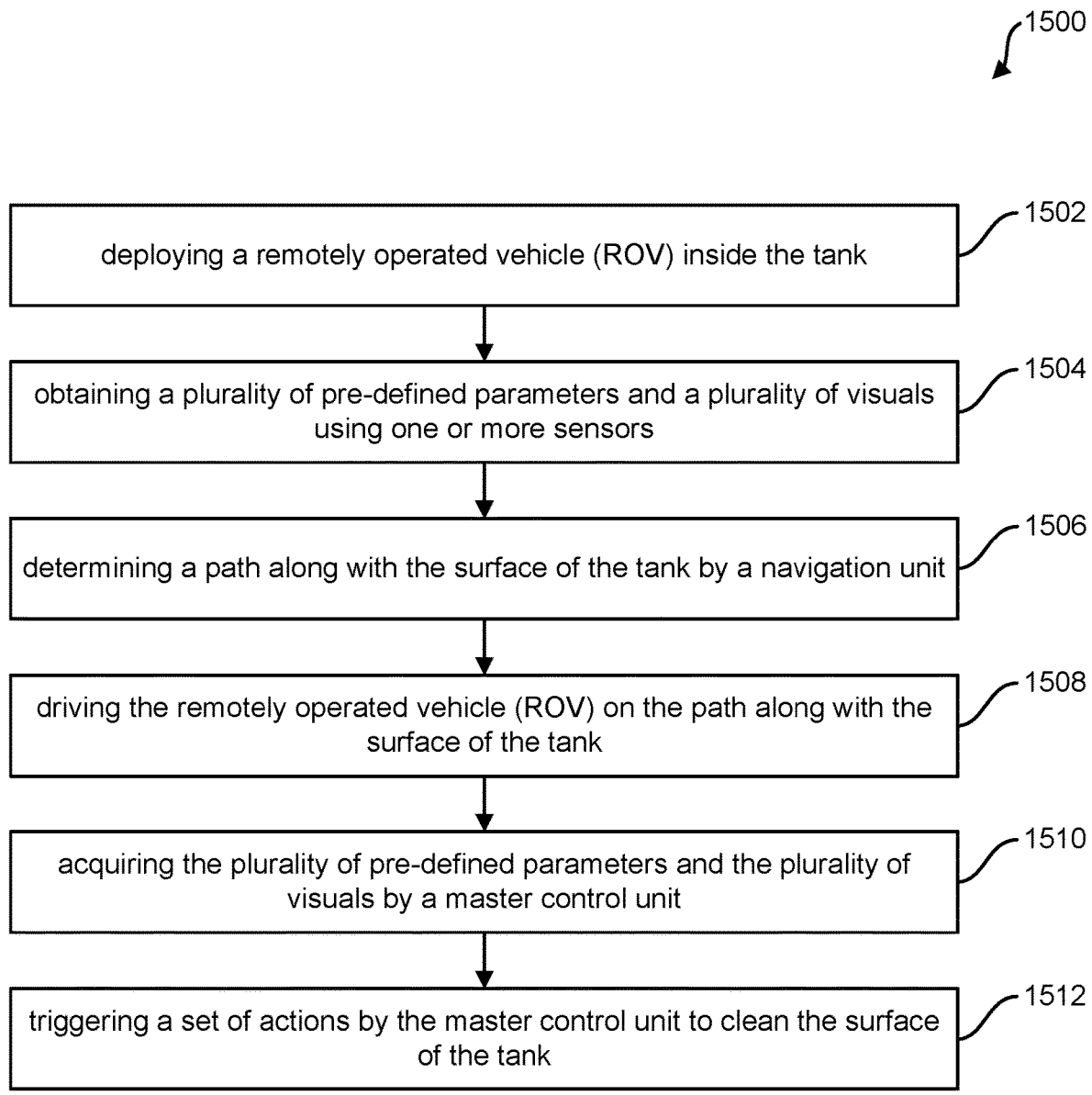
FIG. 15 illustrates a method of operating the remotely operated vehicle (ROV) inside the tank to inspect and further clean the surface of the tank.

FIG. 15 illustrates a method (1500) for performing inspecting and cleaning action of the remotely operated vehicle (ROV) (102). The method includes a first step 1502. At step 1502, the remotely operated vehicle (ROV) (102) is deployed inside the tank. Further, the method includes another step 1504. At step 1504, the remotely operated vehicle (ROV) (102) obtains the multiple parameters and the visuals using the multiple sensors and the navigation unit. In addition, the multiple sensors are transducers, sonar, camera, GPS and the like.

At step 1506, the remotely operated vehicle (ROV) (102) sends a set of readings based on the multiple parameters and the visuals using the multiple sensors and the navigation unit to a master control unit (132). Further, the method includes another step 1508. At step 1508, the master control unit receives and verifying position and operability of the remotely operated vehicle (ROV).

At step 1510, the master control unit instruct the remotely operated vehicle (ROV) (102) to determine path along the surface of the tank. Further, the method includes another step 1512. At step 1512, the remotely operated vehicle (ROV) (102) tends to drive on the path along the surface that is determined using the navigation unit.

Further, the method includes a final step 1514. At step 1514, the master control unit of the remotely operated vehicle (ROV) (102) triggers a set of actions to clean the surface.

The invention claimed is:

1. A remotely operated vehicle (ROV) for non-destructively inspecting and cleaning a surface, wherein the remotely operated vehicle (ROV) comprises:
   an inspection module for inspecting the surface, wherein the inspection module includes:
      a camera for visualizing the path;
      a navigation unit for determining a path on the surface; and
      a motorized unit for driving the remotely operated vehicle (ROV); and
   a cleaning module for providing a cleaning action to the remotely operated vehicle (ROV) on the surface, wherein the cleaning module and the inspection module slog together to inspect and clean the surface; and
   a GPS system to extrapolate the total displacement of the robot (ROV) from the input voltages of the motorized unit.

2. The remotely operated vehicle (ROV) in accordance with claim 1, wherein the navigation unit further comprises:
   a plurality of transducers configured for measuring one or more parameters of the surface including gas pressure or gas levels;
   a sensor mounted on the top of the ROV wherein the sensor provides a location of the ROV to the transducers;
   a camera mounted on the top of the ROV, wherein the camera
provides a number of visuals to the navigation unit; and
   a sonar erector for scanning one or more obstacles in the path.

3. The remotely operated vehicle (ROV) in accordance with claim 1, wherein the plurality of transducers are ultrasonic transducers.

4. The remotely operated vehicle (ROV) in accordance with claim 1, wherein the motorized unit is coupled to a plurality of wheels of the remotely operated vehicle (ROV), further wherein the motorized units drives the remotely operated vehicle (ROV) in one or more directions on the path to clean the surface.

5. The remotely operated vehicle (ROV) in accordance with claim 1, wherein the surface is a submerged surface.

6. The remotely operated vehicle (ROV) in accordance with claim 1, wherein the cleaning module further comprises:
   a pump with a first side and a second side;
   a suction hose mechanically coupled with the pump from the first side, wherein the suction hose provides pressure to clean the surface; and
   a nozzle assembly mechanically coupled with the pump from the second side,
wherein the nozzle assembly draws residue from the path to clean the surface.

7. The remotely operated vehicle (ROV) in accordance with claim 1, wherein the cleaning action is based on removal of dust, residue and liquid from the surface.

8. The remotely operated vehicle (ROV) in accordance with claim 1, wherein movement speed of the remotely operated vehicle (ROV) is at least 500 millimeters per second.

9. The remotely operated vehicle (ROV) in accordance with claim 1, wherein the remotely operated vehicle (ROV) further includes a plurality of sensors for monitoring one or more parameters and conditions prevailing in the surface of a tank.

10. The remotely operated vehicle (ROV) in accordance with claim 1, wherein the remotely operated vehicle (ROV) further includes a base plate for supporting the inspection module and the cleaning module.

11. The remotely operated vehicle (ROV) in accordance with claim 4, wherein the motorized unit further comprises:
   a plurality of wheel plates for accommodating the plurality of wheels on each side of the base plate; and
   a plurality of wheel support plates for connecting the plurality of wheel plates with the wheels.

12. The remotely operated vehicle (ROV) in accordance with claim 1 or claim 9, wherein the remotely operated vehicle (ROV) is connected with a master control unit through wired, further wherein the master control unit provides power to the remotely operated vehicle (ROV).

13. The remotely operated vehicle (ROV) in accordance with claim 12, wherein the master control unit comprises:
   a controller for providing one or more commands to operate the remotely operated vehicle (ROV) for inspecting and cleaning the surface; and
   an electrical distribution board for providing power to the remotely operated vehicle (ROV) based on the one or more commands provided by the controller.

14. The remotely operated vehicle (ROV) in accordance with claim 12, wherein the master control unit is further connected to a plurality of computing devices through wired connection to verify position and function of each of the plurality of sensors, the inspection module and the cleaning module.

15. The remotely operated vehicle (ROV) in accordance with claim 12, wherein the master control unit further includes an authentication unit for authenticating a user for operating and controlling the remotely operated vehicle (ROV).

16. The system in accordance with claim 12, wherein the master control unit includes a plurality of buttons and joy-sticks for controlling the inspection module and the cleaning module.

17. A method for non-destructively inspecting and cleaning a surface, wherein the method comprises:
   deploying a remotely operated vehicle (ROV);
   obtaining one or more parameters and a number of visuals of the surface;
   sending a set of readings based on the one or more parameters and the number of visuals;
   receiving and verifying position and operability of the remotely operated vehicle (ROV);
   determining a path on the surface to be cleaned;
   driving the remotely operated vehicle (ROV) on the path; and
   triggering a set of cleaning actions to clean the surface.

18. A system for non-destructively inspecting and cleaning a surface, wherein the system comprises:
   a remotely operated vehicle (ROV) for inspecting and cleaning the surface, wherein the remotely operated vehicle (ROV) includes:
      an inspection module for inspecting the surface, the inspection module includes:

a navigation unit for determining a path on the surface; further wherein the navigation unit includes:
  a plurality of transducers configured for measuring one or more parameters of the surface including gas pressure or gas levels;
  a camera mounted on the top of the ROV, wherein the camera provides a number of visuals to the navigation unit;
  a sonar erector for scanning one or more obstacles in the path; and
  a GPS system to extrapolate the total displacement of the robot (ROV) from the input voltages of a motorized unit; and
the motorized unit for driving the remotely operated vehicle (ROV); and
a cleaning module for providing a cleaning action to the remotely operated vehicle (ROV) on the surface, wherein the cleaning module includes:
  a pump with a first side and a second side;
  a suction hose mechanically coupled with the pump from the first side, wherein the suction hose provides pressure to clean the surface; and
  a nozzle assembly mechanically coupled with the pump from the second side, wherein the nozzle assembly draws residue from the path to clean the surface; and
a master control unit connected to the remotely operated vehicle (ROV) through wired connections for operating and controlling the remotely operated vehicle (ROV), wherein the master control unit includes:
  a controller for providing commands to operate the remotely operated vehicle (ROV) for inspecting and cleaning the surface; and
  an electronic distribution board for providing power to the remotely operated vehicle (ROV) according to the commands provided by the controller to inspect and clean the surface.

19. A non-transitory computer program product comprising a computer useable medium having computer program logic for enabling at least one processor in a computer system for inspecting and cleaning a surface via a software platform, said computer program logic comprising:
  deploying a remotely operated vehicle (ROV);
  obtaining one or more parameters and a number of visuals of the surface;
  sending a set of readings based on the one or more parameters and the number of visuals;
  receiving and verifying position and operability of the remotely operated vehicle (ROV);
  determining a path on the surface to be cleaned and inspected;
  driving the remotely operated vehicle (ROV) on the path; and
  triggering a set of cleaning actions to clean the surface.

\* \* \* \* \*